(12) United States Patent
Shen et al.

(10) Patent No.: US 11,481,884 B2
(45) Date of Patent: Oct. 25, 2022

(54) IMAGE QUALITY ENHANCEMENT FOR AUTONOMOUS VEHICLE REMOTE OPERATIONS

(71) Applicant: Nuro, Inc., Mountain View, CA (US)

(72) Inventors: Yichao (Roger) Shen, Mountain View, CA (US); Alexandr Bakhturin, Santa Clara, CA (US); Chenjie Luo, Foster City, CA (US); Albert Meixner, Mountain View, CA (US); Ian Zhou, Pleasanton, CA (US); Hubert Hua Kian Teo, San Mateo, CA (US); William Paul Maddern, Sunnyvale, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 17/173,364

(22) Filed: Feb. 11, 2021

(65) Prior Publication Data

US 2021/0383517 A1 Dec. 9, 2021

Related U.S. Application Data

(60) Provisional application No. 63/034,609, filed on Jun. 4, 2020.

(51) Int. Cl.
*H04N 7/18* (2006.01)
*G06T 5/50* (2006.01)
(Continued)

(52) U.S. Cl.
CPC ............ *G06T 5/50* (2013.01); *G05D 1/0038* (2013.01); *G06K 9/6228* (2013.01); *G06T 5/002* (2013.01);
(Continued)

(58) Field of Classification Search
CPC ..... G06T 3/4007; G06T 7/223; H04N 19/523; H04N 19/80; H04N 19/51; H04N 19/513; H04N 19/52
(Continued)

(56) References Cited

U.S. PATENT DOCUMENTS

| 8,102,423 B2 | 1/2012 | Cheng |
| 8,405,732 B2 | 3/2013 | Ahiska et al. |

(Continued)

FOREIGN PATENT DOCUMENTS

WO 2016149576 A1 9/2016

OTHER PUBLICATIONS

International Search Report and Written Opinion in counterpart International Application No. PCT/US2021/035152, dated Sep. 16, 2021, 14 pages.

*Primary Examiner* — Masum Billah
(74) *Attorney, Agent, or Firm* — Edell, Shapiro & Finnan, LLC

(57) ABSTRACT

Techniques for image quality enhancement for autonomous vehicle remote operations are disclosed herein. An image processing system of an autonomous vehicle can obtain images captured by at least two different cameras and stitch the images together to create a combined image. The image processing system can apply region blurring to a portion of the combined image to create an enhanced combined image, e.g., to blur regions/objects determined to be less import (or unimportant) for the remote operations. The image processing system can encode pixel areas of the enhanced combined image using a corresponding quality setting for respective pixel areas to create encoded image files, e.g., based on complexity levels of the respective pixel areas. The image processing system can transmit the encoded image files to a (Continued)

remote operations system associated with the autonomous vehicle for remote operations support.

21 Claims, 19 Drawing Sheets

(51) Int. Cl.
| | |
|---|---|
| *H04N 5/247* | (2006.01) |
| *H04N 5/265* | (2006.01) |
| *G06T 5/00* | (2006.01) |
| *G06K 9/62* | (2022.01) |
| *H04N 19/119* | (2014.01) |
| *G05D 1/00* | (2006.01) |
| *H04N 19/14* | (2014.01) |

(52) U.S. Cl.
CPC ............ *H04N 5/247* (2013.01); *H04N 5/265* (2013.01); *H04N 7/181* (2013.01); *H04N 19/119* (2014.11); *H04N 19/14* (2014.11); *G06T 2207/20221* (2013.01); *G06T 2207/30252* (2013.01)

(58) Field of Classification Search
USPC .......................................................... 348/148
See application file for complete search history.

(56) References Cited

U.S. PATENT DOCUMENTS

| | | | |
|---|---|---|---|
| 9,355,433 | B1 | 5/2016 | Adsumilli et al. |
| 9,723,272 | B2 | 8/2017 | Lu et al. |
| 9,900,522 | B2 | 2/2018 | Lu |
| 10,313,584 | B2 | 6/2019 | Pan et al. |
| 10,486,596 | B2 | 11/2019 | Rathi et al. |
| 2003/0174773 | A1 | 9/2003 | Comaniciu et al. |
| 2008/0309777 | A1* | 12/2008 | Aoyama ............... G06K 9/4647 348/222.1 |
| 2015/0131924 | A1* | 5/2015 | He ....................... H04N 5/2624 382/284 |
| 2015/0237351 | A1* | 8/2015 | Lee ...................... H04N 19/156 375/240.26 |
| 2017/0076433 | A1 | 3/2017 | Hellier et al. |
| 2018/0136644 | A1 | 5/2018 | Levinson et al. |
| 2018/0348750 | A1 | 12/2018 | Lupa et al. |
| 2019/0143896 | A1* | 5/2019 | Rathi .................. H04N 5/23229 348/148 |
| 2019/0230282 | A1 | 7/2019 | Sypitkowski et al. |
| 2020/0142421 | A1 | 5/2020 | Palanisamy et al. |
| 2020/0284883 | A1* | 9/2020 | Ferreira ................ G01S 17/931 |
| 2020/0313768 | A1* | 10/2020 | Cox .......................... G06T 7/20 |
| 2021/0201464 | A1* | 7/2021 | Tariq .................... G05D 1/0246 |

* cited by examiner

IMAGE QUALITY ENHANCEMENT FOR AUTONOMOUS VEHICLE REMOTE OPERATIONS

CROSS REFERENCE TO RELATED APPLICATION

This application claims priority to U.S. Provisional Patent Application No. 63/034,609, titled "Methods and Apparatus to Enhance Operability in Autonomous Vehicle Remote Operations," filed Jun. 4, 2020, the entirety of which is hereby incorporated herein by reference.

TECHNICAL FIELD

The disclosure relates generally to providing image quality enhancement for facilitating remote operations for autonomous vehicles.

BACKGROUND

The handling and delivery of goods and services using autonomous vehicles will improve society, e.g., by allowing people to engage in productive work while waiting for an autonomous vehicle to deliver goods rather than spending time procuring the goods. As the use of autonomous vehicles is growing, the ability to operate the autonomous vehicles safely is becoming more important.

DESCRIPTION OF EXAMPLE EMBODIMENTS

Overview

Figure 1:
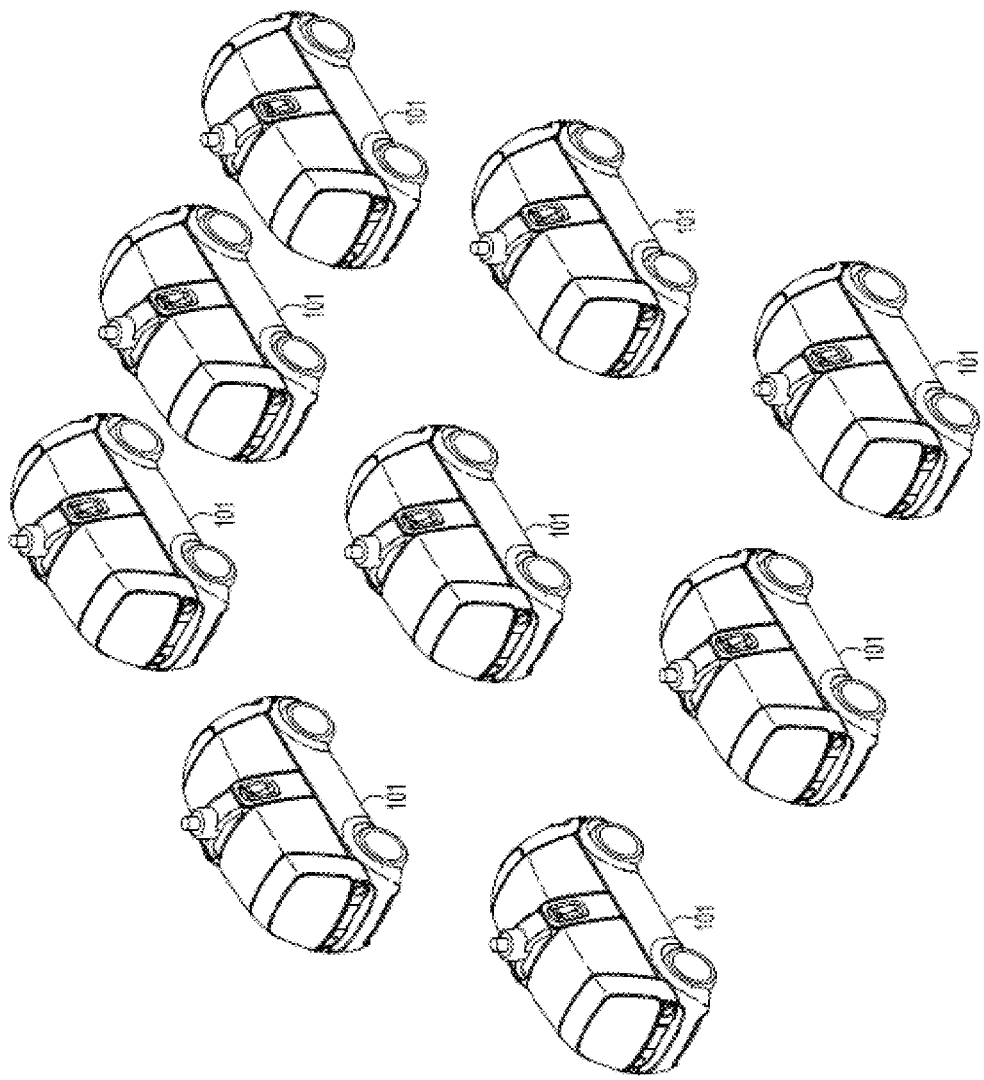
FIG. 1 is a diagram of an autonomous vehicle fleet in which techniques for image quality enhancement for autonomous vehicle remote operations may be implemented, according to an example embodiment.

In one embodiment, an image processing system of an autonomous vehicle can be configured to obtain a plurality of images captured from at least two different cameras of the autonomous vehicle. Each image can include, for example, a still image or a video image. The image processing system can stitch the images together to create a combined image. For example, stitching can include replacing pixels from a first of the images with pixels from a second of the images, the first and second images being from first and second cameras, respectively. The first camera can, but may not necessarily, have a larger field of view (FOV) than the second camera.

The image processing system can apply blurring to a portion of the combined image to create an enhanced combined image. For example, the blurring can include blurring one or more regions and/or objects in the combined image, which are determined by the image processing system to be less important (or unimportant) for remote operations support processing purposes. Other regions and/or objects may not be blurred. The image processing system can encode a plurality of pixel areas of the enhanced combined image using a corresponding quality setting for respective pixel areas to create a plurality of encoded image files. For example, the quality setting for each particular one of the respective pixel areas can, but may not necessarily, correspond to a complexity level of the particular one of the respective pixel areas. The image processing system can transmit the encoded image files to a remote operations system associated with the autonomous vehicle for remote operations support.

Example Embodiments

To ensure the safe operation of autonomous vehicles, remote operations systems (sometimes called "remote support systems") are often used to provide remote assistance for the autonomous vehicles. A remote operations system is a system that is located physically apart from an autonomous vehicle and includes one or more computer-based processes for assisting the autonomous vehicle. For example, a remote operations system can include one or more teleoperations or remote control mechanisms through which a human operator can seize control of, and command operation of, the autonomous vehicle. In addition, or in the alternative, the remote operations system can include one or more vehicle assistance mechanisms through which supervision, information, and/or other input may be provided to the autonomous vehicle with or without control of the autonomous vehicle being seized by the remote operations system.

To provide effective assistance, the remote operations system obtains information from the autonomous vehicle regarding its operation. This information generally includes images (still and/or video) captured by cameras on the autonomous vehicle. For example, the images can include views of some or all of the autonomous vehicle and/or an environment within which the autonomous vehicle is operating. A human operator and/or one or more computer-based processes of the remote operations system can use information from the images to make decisions regarding operation of the autonomous vehicle. For example, the human operator and/or computer-based processes may use this information to help the autonomous vehicle navigate around an accident scene, a crossing guard, police directing traffic, a flashing crosswalk, a pothole, a construction zone, or another hazard, or to address a situational issue like a honking vehicle, emergency siren, tailgating vehicle, etc.

Quality of the images provided by the autonomous vehicles can impact the ability of the remote operations system to provide effective support. For example, a low resolution image may prevent the remote operations system and/or remote human operator from being able to "see" the autonomous vehicle environment clearly enough to make an informed decision regarding an appropriate remote assistance operation. Image quality can be impacted, e.g., by an available network bitrate for transmitting images from the autonomous vehicle to the remote operations system. For example, an available network bitrate may be inadequate to provide high quality images from the cameras.

In an example embodiment, an image processing system of an autonomous vehicle can be configured to process image data to selectively enhance image quality prior to transmitting the image data to the remote operations system. For example, the image processing system may process the image data to prioritize selected portions of the image data so that they have a higher resolution and/or finer encoding than less prioritized portions of the image data. The prioritized portions may correspond, for example, to regions and/or objects in the images that are more likely to be material to operation of the autonomous vehicle. For example, the image processing system may prioritize portions of the image data corresponding to a neighboring vehicle, traffic light, traffic sign, curb, or pedestrian while not prioritizing portions of the image data corresponding to a skyline, trees, leaves, bugs, dust, walls, stationary objects in yards, and/or other environmental elements, which are not material to operation of the autonomous vehicle. Thus, the image processing system can manage network bitrate limitations for the overall image without materially sacrificing efficacy of the image data, i.e., while ensuring high quality for high priority portions of the image data.

The processing may include, for example, stitching together images from two or more cameras of the autonomous vehicle to create a combined image. For example, stitching can include replacing a set of pixels from a first image from a first camera with a set of pixels from a second image from a second camera. The first camera can, but may not necessarily, have a larger FOV (and therefore a lower resolution or pixel density) than the second camera. For example, the combined image can include an overall FOV corresponding to the (larger) FOV of the first camera, with an enhanced visual acuity for an area corresponding to the (smaller) FOV of the second camera. In addition, or in the alternative, stitching may involve adding one or more images to another image, e.g., at a side or edge of the image, to create a panoramic (or other type of) overall image.

The processing also may include blurring a portion of the combined image to create an enhanced combined image. For example, the blurring can include blurring one or more regions and/or objects in the combined image, which are determined by the image processing system to be less important (or unimportant) for remote operations support processing purposes. The image processing system may make this determination, e.g., using one or more computer vision, machine learning, statistical logic, historical operational data, or other mechanisms. For example, the image processing system may determine to blur environmental elements, which are not material to operation of the autonomous vehicle, while not blurring other regions and/or objects (which are not determined to be less important or unimportant). Blurring the less important (or unimportant) regions/object may, e.g., reduce a memory required for those regions/objects, thereby "freeing up" memory (and correspondingly, available network bitrate) for providing higher resolution for other, more important regions/objects.

The image processing system can encode pixel areas of the enhanced combined image using a corresponding quality setting for respective pixel areas to create encoded image files. For example, the quality setting for each particular one of the respective pixel areas can, but may not necessarily, correspond to a complexity level of the particular one of the respective pixel areas. The image processing system can transmit the encoded image files to a remote operations system associated with the autonomous vehicle for remote operations support.

Example embodiments that may be used to implement the features and functionality of this disclosure will now be described with more particular reference to the accompanying figures. When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment is described herein as illustrative and is not to be construed as a preferred or advantageous embodiment, but rather as one example or illustration of a possible embodiment.

Referring initially to FIG. 1, an autonomous vehicle fleet 100 will be described in accordance with an example embodiment. The autonomous vehicle fleet 100 includes a plurality of autonomous vehicles 101. Each autonomous vehicle 101 is a manned or unmanned mobile machine configured to transport people, cargo, or other items, whether on land or water, air, or another surface, such as a car, wagon, van, tricycle, truck, bus, trailer, train, tram, ship, boat, ferry, drove, hovercraft, aircraft, spaceship, etc.

Each autonomous vehicle 101 may be fully or partially autonomous such that the vehicle can travel in a controlled manner for a period of time without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

Figure 2:
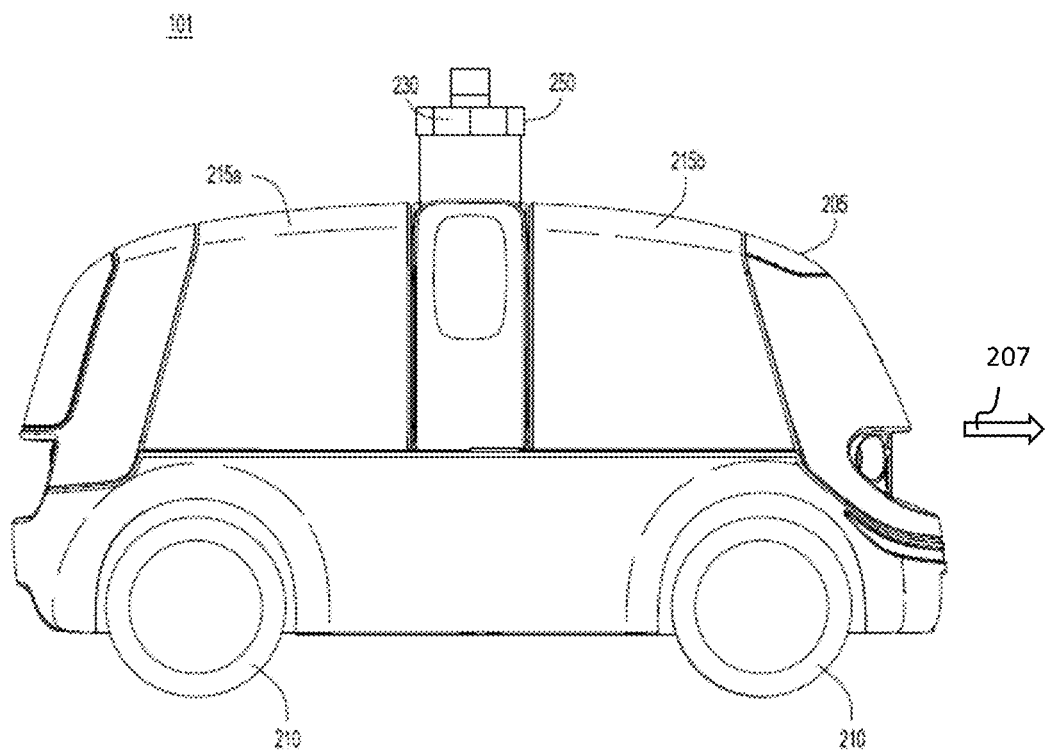
FIG. 2 is a diagram of a side of an autonomous vehicle in which techniques for image quality enhancement for autonomous vehicle remote operations may be implemented, according to an example embodiment.

FIG. 2 is a diagram of a side of an autonomous vehicle 101, according to an example embodiment. The autonomous vehicle 101 includes a body 205 configured to be conveyed by wheels 210 and/or one or more other conveyance mechanisms. For example, the autonomous vehicle 101 can drive in a forward direction 207 and a reverse direction opposite the forward direction 207. In an example embodiment, the autonomous vehicle 101 may be relatively narrow (e.g., approximately two to approximately five feet wide), with a relatively low mass and low center of gravity for stability.

The autonomous vehicle 101 may be arranged to have a moderate working speed or velocity range of between approximately one and approximately forty-five miles per hour ("mph"), e.g., approximately twenty-five mph, to accommodate inner-city and residential driving speeds. In addition, the autonomous vehicle 101 may have a substantially maximum speed or velocity in a range of between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

The autonomous vehicle 101 includes multiple compartments (e.g., compartments 215a and 215b), which may be assignable to one or more entities, such as one or more customers, retailers, and/or vendors. The compartments are generally arranged to contain cargo and/or other items. In an example embodiment, one or more of the compartments may be secure compartments. The compartments 215a and 215b may have different capabilities, such as refrigeration, insulation, etc., as appropriate. It should be appreciated that the number, size, and configuration of the compartments may vary. For example, while two compartments (215a, 215b) are shown, the autonomous vehicle 101 may include more than two or less than two (e.g., zero or one) compartments.

The autonomous vehicle 101 further includes a sensor pod 230 that supports one or more sensors configured to view and/or monitor conditions on or around the autonomous vehicle 101. For example, the sensor pod 230 can include one or more cameras 250, light detection and ranging ("LiDAR") sensors, radar, ultrasonic sensors, microphones, altimeters, or other mechanisms configured to capture images (e.g., still images and/or videos), sound, and/or other signals or information within an environment of the autonomous vehicle 101.

Figure 3:
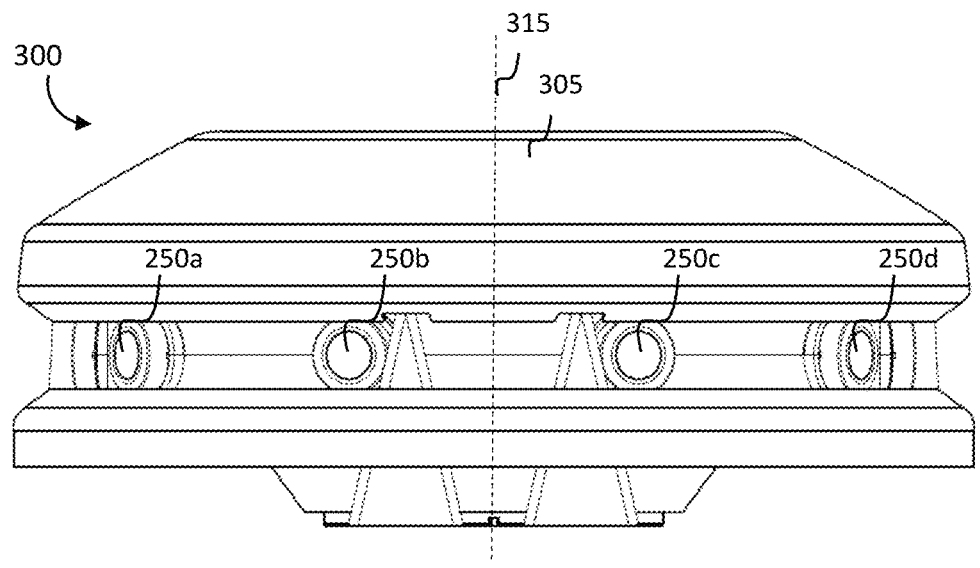
FIG. 3 is a diagram of a side of a camera assembly for the autonomous vehicle of FIG. 2, according to an example embodiment.
Figure 4:
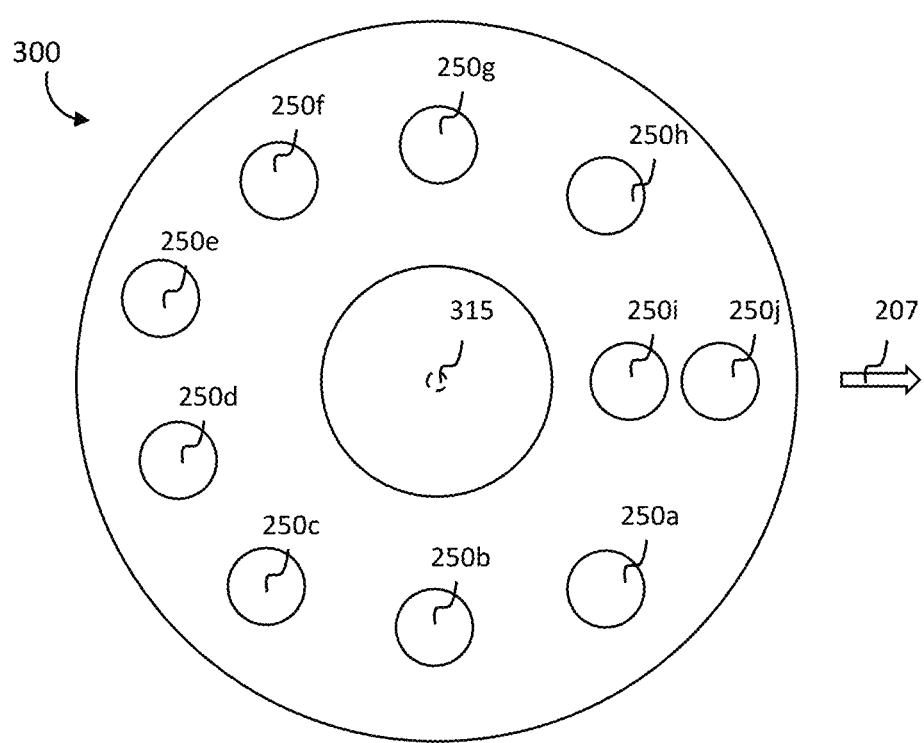
FIG. 4 is a top cross-sectional view of the camera assembly of FIG. 3, according to an example embodiment.

FIG. 3 is a diagram of a side of a camera assembly 300 of the autonomous vehicle 101, according to an example embodiment. FIG. 4 is a top cross-sectional view of the camera assembly 300, according to an example embodiment. FIGS. 3 and 4 are described together for ease of description.

The camera assembly 300 includes a housing 305 configured to be mounted on the autonomous vehicle, e.g., as part of the sensor pod 230. The housing 305 defines a space within which a plurality of cameras 250a, 250b, 250c, 250d, 250e, 250f, 250g, 250h, 250i, and 250j are substantially disposed. The housing 305 is configured to generally protect the cameras 250a-250j from a surrounding environment while still enabling the cameras 250a-250j to capture images (still images and/or videos), sound, and/or other signals or information from the surrounding environment. For example, the housing 305 can include one or more openings through which ends of the cameras 250a-250j can extend towards the environment and/or the housing 305 may include a substantially transparent window surface through which the cameras 250a-250j can capture images of the environment, even though the window surface may extend across one or more FOVs of the cameras 250a-250j.

Each of the cameras 250a-250j has a resolution and range, which may be the same as, or different from, a resolution and/or range of another of the cameras 250a-250j. For example, each of the cameras 250a-250j can include one or more long range cameras with an approximately 60° FOV or one or more short range (or "traffic light") cameras with an approximately 120° FOV, with each of the cameras having a resolution between about 2 megapixels (MP) and about 8 MP. As may be appreciated, these ranges and resolutions are illustrative, and other types of cameras with other suitable ranges and resolutions may be included in alternative example embodiments. Moreover, each of the cameras 250a-250j can include any of a variety of different camera lenses, such as a standard lens, wide-angle lens, telephoto lens, zoom lens, fisheye lens, etc.

For example, in an example embodiment, each of cameras 250a-250i includes a long range camera, camera 250j includes a short range camera, and one or more thermal cameras and/or other types of sensor devices, which may have a same or different range and/or resolution from any of the cameras 250a-250j, may be included on or around one or more of the cameras 250a-250j. Moreover, it should be appreciated that the shape and arrangement of the camera assembly 300 is illustrative and may vary in alternative example embodiments. For example, while FIGS. 3 and 4 illustrate ten cameras 250a-250j arranged in a generally circular shape around the central axis 315, it should be apparent that more or less than ten cameras 250a-250j, and any arrangement or configuration of the cameras 250a-250j within our without a housing 305, can be provided in alternative example embodiments.

Figure 5:
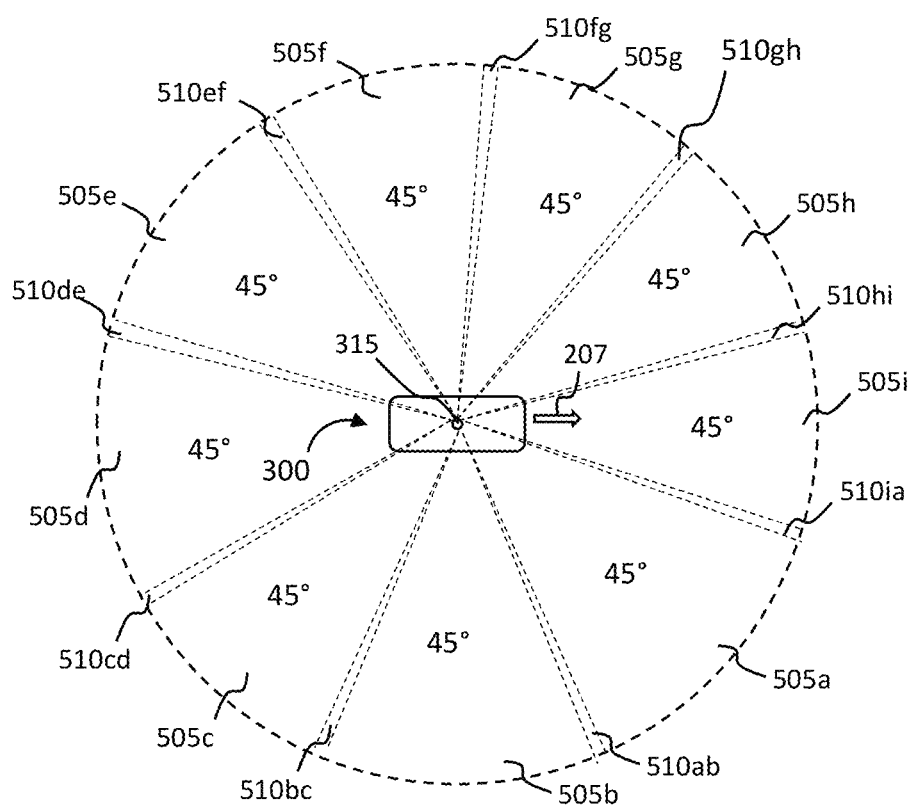
FIG. 5 is a diagram illustrating horizontal fields of view of cameras in the camera assembly of FIG. 3, according to an example embodiment.

FIG. 5 is a diagram of horizontal FOVs 505a, 505b, 505c, 505d, 505e, 505f, 505g, 505h, and 505i of cameras from the camera assembly of FIG. 3, according to an example embodiment. Each of the FOVs 505a-505i corresponds to a camera (e.g., one of cameras 250a-250i described above with reference to FIG. 2) having an approximately 60° horizontal FOV, with FOVs for neighboring cameras overlapping in overlap regions 510. In particular, an overlap region 510ab includes an overlap of FOV 505a and FOV 505b, an overlap region 510bc includes an overlap of FOV 505b and FOV 505c, an overlap region 510cd includes an overlap of FOV 505c and FOV 505d, an overlap region 510de includes an overlap of FOV 505d and FOV 505e, overlap region 510ef includes an overlap of FOV 505e and FOV 505f, overlap region 510fg includes an overlap of FOV 505f and FOV 505g, overlap region 510gh includes an overlap of FOV 505g and FOV 505h, and overlap region 510hi includes an overlap of FOV 505h and FOV 505i. As may be appreciated, the FOVs 505a-505i and degrees of overlap corresponding thereto are illustrative and may vary in alternative example embodiments.

Figure 6:
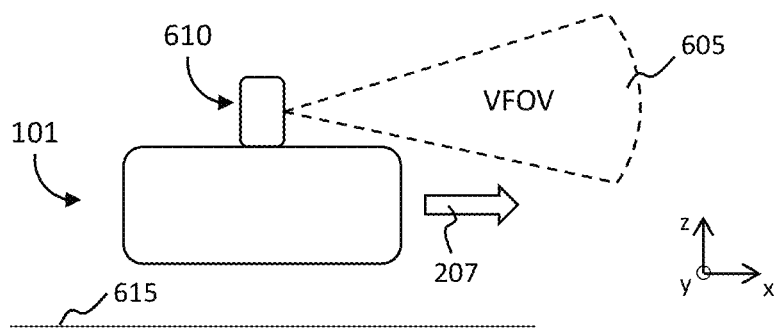
FIG. 6 is a diagram illustrating a vertical field of view of a camera, which may be included in an autonomous vehicle, according to an example embodiment.

FIG. 6 is a diagram of a vertical FOV 605 of a camera 610, which may be included in an autonomous vehicle 101, according to an example embodiment. For example, the camera 610 can be (but does not necessarily have to be) camera 250i or camera 250j described above with reference to FIG. 2. The vertical FOV 605 extends from the camera 610 substantially along a vertical axis, e.g., an axis substantially perpendicular to an axis defined by a road surface 615 on which the autonomous vehicle 101 is operating. The vertical FOV 605 may be, e.g., approximately 25° for a long range camera or approximately 67° for a short range camera, though, it should be appreciated that the vertical FOV 605 can have any other suitable value.

Figure 7:
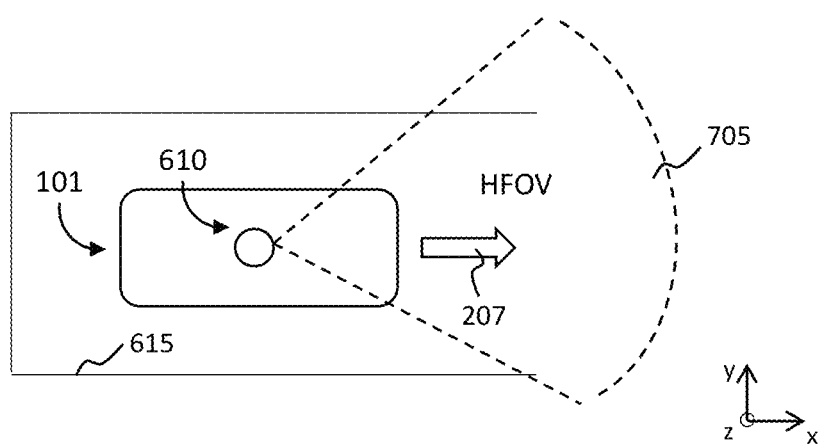
FIG. 7 is a diagram illustrating a horizontal field of view of a particular camera, which may be included in an autonomous vehicle, according to an example embodiment.

FIG. 7 is a diagram of a horizontal FOV 705 of the camera 610, according to an example embodiment. The horizontal FOV 705 extends from the camera 610 substantially along a horizontal axis, e.g., an axis substantially parallel to an axis defined by the road surface 615 on which the autonomous vehicle 101 is operating. The horizontal FOV 705 may be, e.g., approximately 60° for a long range camera or approximately 120° for a short range camera, though, it should be appreciated that the horizontal FOV 705 can have any other suitable value.

Figure 8:
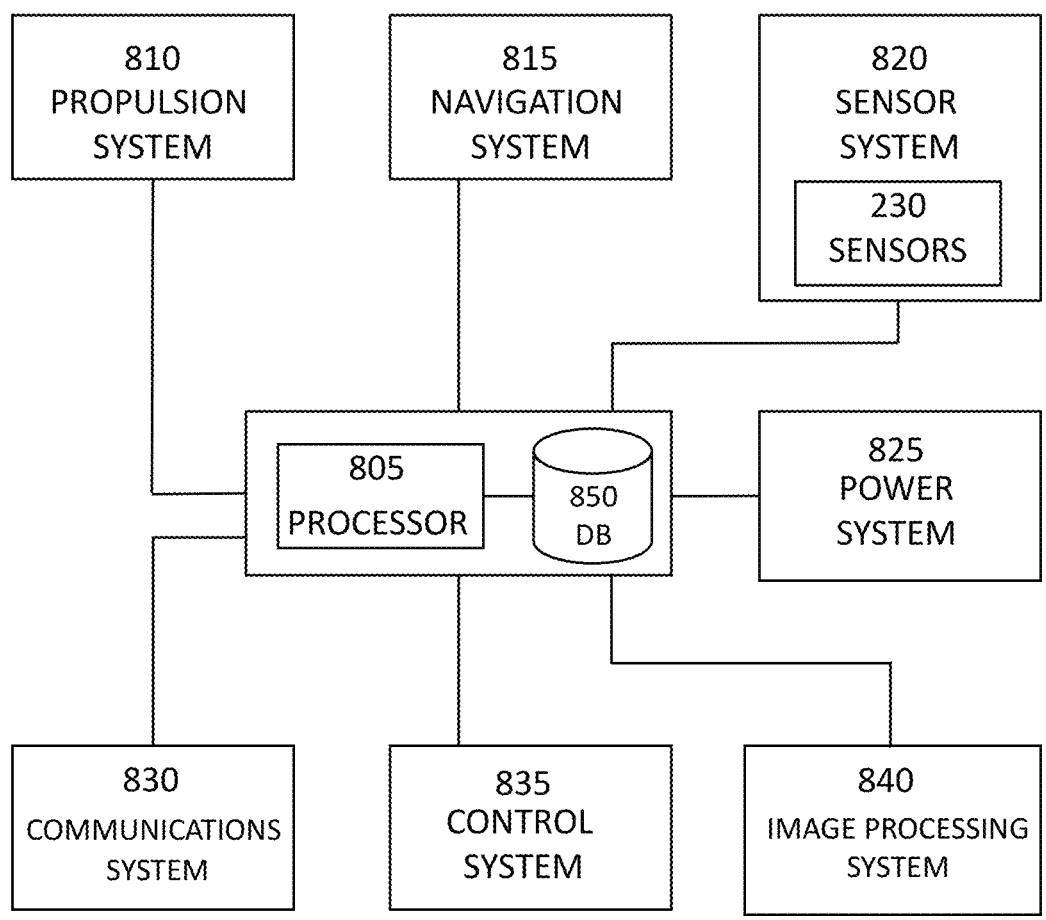
FIG. 8 is a block diagram representation of functional components of an autonomous vehicle, according to an example embodiment.

FIG. 8 is a block diagram representation of certain functional components of the autonomous vehicle 101, according to an example embodiment. The autonomous vehicle 101 includes a processor 805, which is operatively coupled to, and configured to send instructions to, and receive instructions from or for, a database 850 and various systems of the autonomous vehicle 101, including: a propulsion system 810, a navigation system 815, a sensor system 820, a power system 825, a communications system 830, a control system 835, and an image processing system 840. The processor 805, database 850, and systems are operatively coupled to, or integrated with, the body 205 (FIG. 2) of the autonomous vehicle 101 and generally cooperate to operate the autonomous vehicle 101.

The propulsion system 810 includes components configured to drive (e.g., move or otherwise convey) the autonomous vehicle 101. For example, the propulsion system 810 can include an engine, wheels, steering, and a braking system, which cooperate to drive the autonomous vehicle 101. In an example embodiment, the engine may be a gas engine, a turbine engine, an electric motor, and/or a hybrid gas/electric engine. As would be appreciated by a person of ordinary skill in the art, the propulsion system 810 may include additional or different components suitable or desirable for conveying an object, which are now known or hereinafter developed, such as one or more axles, treads, wings, rotors, blowers, rockets, propellers, and/or other components.

Although the autonomous vehicle 101 shown in FIGS. 1 and 2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

The navigation system 815 can be configured to control the propulsion system 810 and/or provide guidance to an operator associated with the autonomous vehicle 101 to navigate the autonomous vehicle 101 through paths and/or within unstructured open or closed environments. The navigation system 815 may include, e.g., digital maps, street view photographs, and/or a global positioning system ("GPS") point. For example, the navigation system 815 may cause the autonomous vehicle 101 to navigate through an environment based on information in the digital maps and information from sensors included in the sensor system 820.

The sensor system 820 includes a sensor pod 230 configured to view and/or monitor conditions on or around the autonomous vehicle 101. For example, the sensor pod 230 can ascertain when there are objects near the autonomous vehicle 101 to enable the autonomous vehicle 101 to safely guide the autonomous vehicle 101 (via the navigation system 815) around the objects. The sensor pod 230 may include, e.g., cameras (such as the cameras 250a-250j described above with reference to FIGS. 2-4), light detection and ranging ("LiDAR"), radar, ultrasonic sensors, microphones, altimeters, etc. In an example embodiment, the sensor system 820 includes propulsion system sensors that monitor drive mechanism performance, drive train performance, and/or power system levels. The sensor system 820 also may include one or more microphones configured to detect sounds external to the autonomous vehicle 101, such as a siren from an emergency vehicle requesting a right-of-way, a honk from another vehicle, etc.

The power system 825 is arranged to provide power to the autonomous vehicle 101. Power may be provided as electrical power, gas power, or any other suitable power, e.g., solar power or battery power. In an example embodiment, the power system 825 may include a main power source and an auxiliary power source configured to power various components of the autonomous vehicle 101 and/or to generally provide power to the autonomous vehicle 101 when the main power source does not have the capacity to provide sufficient power.

The communications system 830 is arranged to enable communication between the autonomous vehicle 101 and an external person or device. For example, the communications system 830 can be configured to enable communication via wireless local area network (WLAN) connectivity (e.g., cellular) or any other wireless or mobile communication capability now known or hereinafter developed. In an example embodiment, the communications system 830 can communicate wirelessly with a fleet management system (not shown in FIG. 8), which is arranged to control and/or assist the autonomous vehicle 101 from a location remote from the autonomous vehicle 101. For example, the communications system 830 can generally obtain or receive data, store the data, and transmit or provide the data to the fleet management system and/or to one or more other vehicles within a fleet. The data may include, but is not limited to, data from the sensor pod 230 (e.g., still and/or video image data), information relating to scheduled requests or orders, information relating to on-demand requests or orders, information relating to a need for the autonomous vehicle 101 to reposition itself, e.g., in response to an anticipated demand, information regarding an operational or mechanical need or behavior of the autonomous vehicle 101, information regarding an upcoming construction zone or other hazard in the path of the autonomous vehicle 101, etc.

The image processing system 840 is arranged to process image data (e.g., still and/or video image data) from the sensor pod 230 (e.g., one or more cameras). For example, the image processing system 840 can obtain images from the sensor pod 230 and selectively enhance a quality of the images for transmission of the (enhanced) images to the fleet management system. This process may include, e.g., stitching together data from images captured by cameras having different FOVs, blurring less important (or unimportant) regions and/or objects in the images to allow for an enhanced visual acuity for other (non-blurred) regions and/or objects, and/or applying quality settings for different pixel areas based on respective complexity and/or priority levels. For example, the communications system 830 may provide the encoded image files to the fleet management system for processing by a remote operations subsystem. Example operations for image quality enhancement for autonomous vehicle remote operations are described in more detail below with reference to FIGS. 11-22.

In an example embodiment, the control system 835 may cooperate with the processor 805 and each of the other systems in the autonomous vehicle 101, including the propulsion system 810, the navigation system 815, the sensor system 820, the power system 825, the communications system 830, and the image processing system 840, to control operation of the autonomous vehicle 101. For example, the control system 835 may cooperate with the processor 805 and the other systems to determine where the autonomous vehicle 101 may safely travel and to detect (e.g., based on data from the sensor system 820 and/or from an external system (not shown) communicating with the autonomous vehicle 101 via the communications system 830), and navigate around, objects in a vicinity around the autonomous vehicle 101. In other words, the control system 835 may cooperate with the processor 805 and other systems to effectively determine and facilitate what the autonomous vehicle 101 may do within its immediate surroundings. For example, the control system 835 in cooperation with the processor 805 may essentially control the power system 825 and/or the navigation system 815 as part of driving or conveying the autonomous vehicle 101. In this sense, the control system 835 manages autonomous control of the autonomous vehicle 101. Additionally, the control system 835 may cooperate with the processor 805 and communications system 830 to provide data to, or obtain data from, other vehicles, a fleet management server, a GPS, a personal computer, a teleoperations system, a smartphone, or any other computing device via the communications system 830.

The database 850 includes data stores or storage structures (e.g., files, databases, data structures, data or other repositories, etc.) that are configured to store information. In an example embodiment, the database 850 is configured to store information regarding the autonomous vehicle 101, jobs/tasks assigned to, and/or performed by, the autonomous vehicle 101, software for the autonomous vehicle 101, etc. For example, the database 350 can include logged information collected by one or more of the systems of the autonomous vehicle 101 during operation of the autonomous vehicle 101. The logged information can include, e.g., data from the sensor pod 230 (e.g., still and/or video image data). For example, the image processing system 840 can use the data from the sensor pod 230 in combination with software and/or other information in the database 850 to provide image quality enhancement for remote operations purposes, as described in more detail below. Though depicted in FIG. 8 as being located within the vehicle 101, it should be recognized that the database 850 could be located remote from the vehicle 101, e.g., in a cloud or data center solution, in alternative example embodiments.

Figure 9:
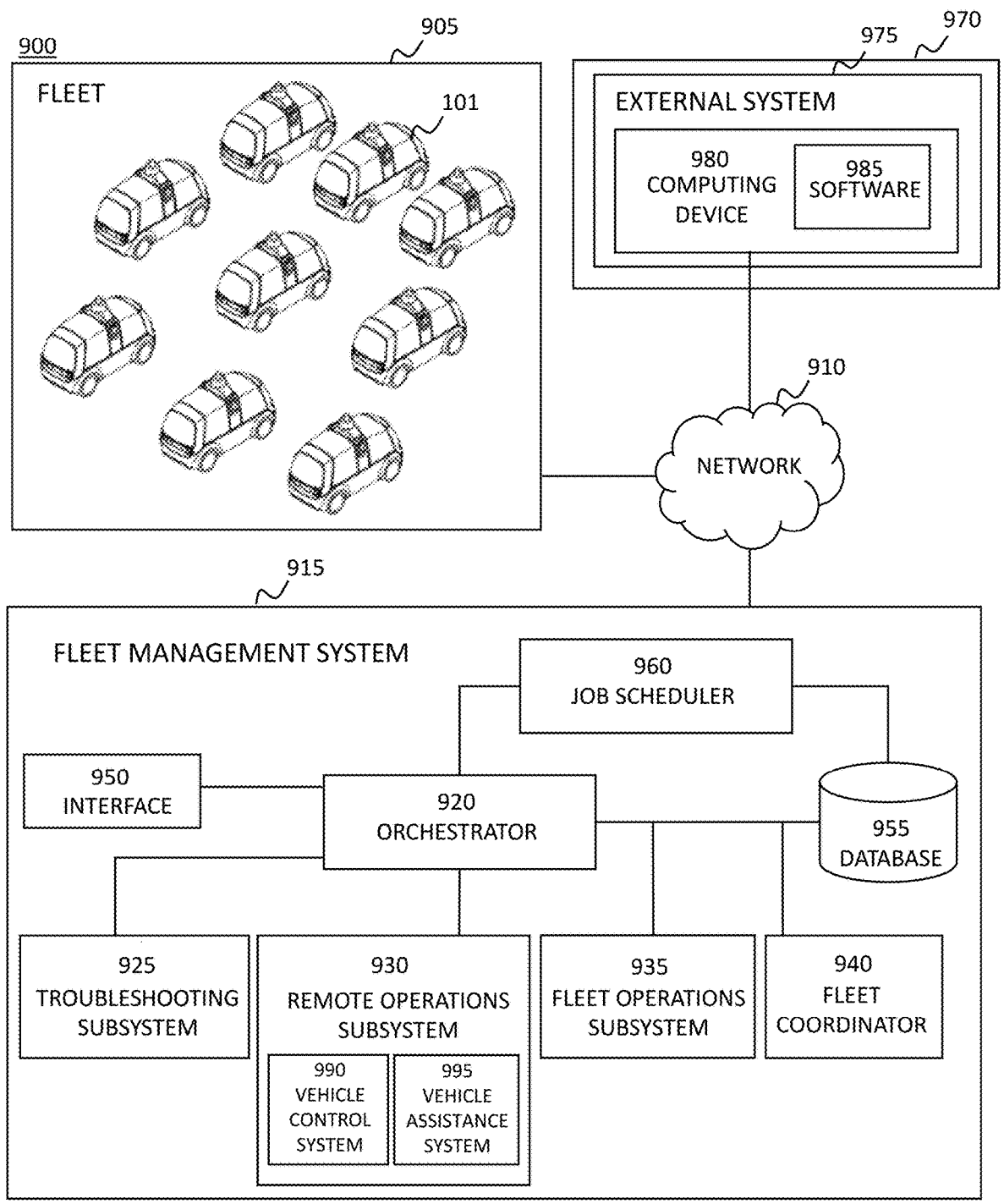
FIG. 9 is a block diagram representation of functional components of an interconnected autonomous vehicle fleet ecosystem in which techniques for image quality enhancement for autonomous vehicle remote operations may be implemented, according to an example embodiment.

FIG. 9 is a block diagram representation of functional components of an interconnected autonomous vehicle fleet ecosystem 900, according to an example embodiment. The ecosystem 900 includes an autonomous vehicle fleet 905 including a plurality of autonomous vehicles 101. The autonomous vehicles 101 in the autonomous vehicle fleet 905 are interconnected with one another, a fleet management system 915, and at least one system external to the fleet management system (an "external system") 975 via at least one network 910. The network 910 can include any communications medium for transmitting information between two or more computing devices. For example, the network 910 can include a wireless local area network (WLAN) capability (e.g., cellular) or any other wireless or mobile communication capability now known or hereinafter developed.

The fleet management system 915 includes an orchestrator 420, which is configured to coordinate operations of the ecosystem 900, including remotely coordinating operations of the autonomous vehicle fleet 905. The orchestrator 920 is operatively coupled to, and configured to send instructions to, and receive instructions from or for, various subsystems of the fleet management system 915, including: a troubleshooting subsystem 925, a remote operations subsystem 930, a fleet operations subsystem 935, a fleet coordinator 940, an interface 950, and a job scheduler 460.

The job scheduler 960 is configured to assign jobs to the autonomous vehicles 101 based on a variety of considerations, including, e.g., constraints for the autonomous vehicles 101 and any human operators and/or physical infrastructure required to compete each job. A "job" is any action to be completed by, or with, the autonomous vehicle 101. Certain jobs may be completed fully autonomously by the autonomous vehicle 101, while other jobs may require at least some involvement by a human. Each job may include one or more tasks or a series of one or more tasks. For example, a job of transporting a package from a first location to a second location may include several tasks, including (among other things): starting the vehicle, procuring the package, identifying a preferred path from the first location to the second location, moving the vehicle along the preferred path to the second location, and providing the package to a designated recipient.

Each job may involve activities that are relevant to fleet operations, vehicle operations, or other matters. For example, certain jobs can include support and maintenance activities, like completing a calibration, charging a battery, updating a map or other software, cleaning an interior or exterior of the vehicle, troubleshooting a problem, etc. As would be recognized by a person of ordinary skill in the art, the jobs and tasks described herein are illustrative and should not be construed as being limiting in any way. For example, job assignments may include considerations of route locations, route driving times, route distances, vehicle locations, vehicle ranges, vehicle charging statuses/needs, parking needs, vehicle storage capacities, capabilities, and/or configurations, relative job priorities, any associations between particular vehicles and particular job sites, etc.

In an example embodiment, the job scheduler 960 is configured to cooperate with the orchestrator 920 and other subsystems of the fleet management system 915 to create and/or change job assignments dynamically. For example, during job planning or execution, the job scheduler 960 may create and/or change job assignments to resolve issues as they arise or to increase operational efficiencies. The job scheduler 960 may operate autonomously or via input from one or more operators. For example, one or more operators may interact with the job scheduler 960 via a user interface provided by the job scheduler 960 to schedule jobs and assign them to autonomous vehicles 101.

A database 955 includes data stores or storage structures (e.g., files, databases, data structures, data or other repositories, etc.) that are configured to store information. In an example embodiment, the database 955 is configured to store information regarding various different types of potential jobs, tasks associated with the different types of potential jobs, software and associated information, patches, logs, etc., for operating the autonomous vehicles 101, known constraints for the autonomous vehicles 101, operators, and physical infrastructure, etc. For example, the job scheduler 960 may reference this information when assigning jobs. The job scheduler 960 also can store in the database 955 information regarding assigned jobs, such as relative priorities of the jobs, an expected start time and completion time for each job and task thereof, an identity of each vehicle/system/operator associated with each job/task, and any software or other resources required to complete each job/task. Though depicted in FIG. 9 as being located within the fleet management system 915, it should be recognized that the database 955 could be located remote from the fleet management system 915, e.g., in a cloud or data center solution, in alternative example embodiments.

The orchestrator 920 is configured to monitor completion of assigned jobs and coordinate completion of tasks by the autonomous vehicles 101 and the other subsystems of the fleet management system 915 in order to enable completion of the assigned jobs. The orchestrator 920 can identify, for each job (or type of job), a plurality of tasks to be completed. For example, the database 955 can include, and the orchestrator 920 can read, consider, and where appropriate, provide, or cause to be provided, to the autonomous vehicles 101 or one or more systems internal or external to the fleet management system 915, information indicating tasks to be performed for each job (or type of job), information indicating each subsystem (or the vehicle, if applicable) responsible for completing and/or coordinating each task, any software or other resources required to complete each job/task, and any other information or materials necessary or desirable for facilitating completion of the tasks.

The troubleshooting subsystem 925 is configured to obtain information from the autonomous vehicles 101 that indicates whether any of the autonomous vehicles 101 have issues, e.g., health issues, that are affecting, or are about to affect, the ability of the autonomous vehicles 101 to function. For example, the autonomous vehicles 101 may be configured to self-report issues or may be configured to provide general information from which the troubleshooting subsystem 925 may detect issues. The troubleshooting subsystem 925 can process information from the autonomous vehicles 101 to diagnose and address issues. In an example embodiment, the troubleshooting subsystem 925 may be configured to diagnose and address certain issues fully autonomously and to escalate certain other issues for input and/or action by a human operator via a user interface provided by the troubleshooting subsystem 925. For example, the troubleshooting subsystem 925 may be configured to diagnose and address certain predefined health issues using information in the database 955. The troubleshooting subsystem 425 also may be configured to coordinate with the orchestrator 420 to cause one or more rescue or replacement vehicles to be dispatched as needed.

The troubleshooting subsystem 925 may operate autonomously or via input from one or more operators. For example, one or more operators may interact with the troubleshooting subsystem 925 via a user interface provided by the troubleshooting subsystem 925 to view, update, and take action with respect to, vehicle health information.

The remote operations subsystem 930 is configured to provide remote assistance to the autonomous vehicles 101. In particular, the remote operations subsystem 930 includes a vehicle control system 990, which is configured to effectively seize control of the autonomous vehicle 101, e.g., through a teleoperations or remote control mechanism, and a vehicle assistance system 995, which is configured to provide assistance (e.g., supervision and/or input) to the autonomous vehicles 101 without taking control of the autonomous vehicles 101. Though described herein as distinct systems, the vehicle control system 990 and vehicle assistance system 995 may share certain operational and logical components. For example, the vehicle control system 990 and vehicle assistance system 995 can share certain communication/processing equipment and a human operation station through which a human operator can operate, remotely control, and remotely assist an autonomous vehicle 101. As described in more detail below in connection with FIG. 10, the human operation station can include, for example, a driver seat, a steering wheel, brake and acceleration pedals, a gear shifter, and a visual interface that is configured to allow a human operator to view an environment in which an autonomous vehicle 101 is driving. In addition, or in the alternative, the human operation station can include a handheld or other remote controlled device through which a human can drive or otherwise control or assist an autonomous vehicle 101.

In an example embodiment, the remote operations subsystem 930 may take control over, and/or provide assistance to, an autonomous vehicle 101 in response to a request for such action by the autonomous vehicle 101 or based on a behavior or situation observed by the fleet management system 915. For example, the orchestrator 920 may cause the remote operations subsystem 930 to take control over, and/or provide assistance to, the autonomous vehicle 101 in response to a determination that the autonomous vehicle 101 is unable to safely and/or effectively complete a particular job or task autonomously. This determination may be based, e.g., on sensor data (e.g., one or more still and/or video images) or other information from the autonomous vehicle 101. In an example embodiment, the orchestrator 920 may coordinate operations between the remote operations subsystem 930, the troubleshooting subsystem 925, the fleet operations subsystem 935, and the fleet coordinator 940 to effectively decommission and recover autonomous vehicles 101 in need of service.

The fleet operations subsystem 935 is configured to coordinate maintenance and servicing of autonomous vehicles 101 in the fleet 405. For example, the fleet operations subsystem 435 can schedule and coordinate planned (e.g., routine) and unplanned (e.g., emergency) servicing, cleaning, charging, and other maintenance activities. The fleet operations subsystem 435 also may be configured to remotely start the autonomous vehicles 101 from a dormant state, e.g., through a "one-click" or other remote startup operation. For example, the fleet operations subsystem 435 may determine, based on health and/or configuration information for an autonomous vehicle 101 and/or a job associated with the autonomous vehicle 101, whether the autonomous vehicle 101 is ready to operate.

The fleet operations subsystem 935 may operate autonomously or via input from one or more operators. For example, one or more operators may interact with the fleet operations subsystem 935 via a user interface provided by the fleet operations subsystem 935 to view, update, and take action with respect to maintenance and servicing information for the autonomous vehicles 101 and/or for groups of autonomous vehicles 101 within the fleet 905.

The fleet coordinator 940 is configured to oversee the general operations of the autonomous vehicles 101 in the fleet 905 and to coordinate, via the orchestrator 920, with the job scheduler 960 and other subsystems of the fleet management system 915 to make any necessary scheduling or job assignment adjustments. For example, the fleet coordinator 940 may cause one or more jobs from a first autonomous vehicle 101 to be reassigned to at least one other autonomous vehicle 101 if the first autonomous vehicle 101 is removed from service. The fleet coordinator 940 also may coordinate delivery of a new, replacement autonomous vehicle 101 if an autonomous vehicle 101 is recovered.

The fleet coordinator 940 may operate autonomously or via input from one or more operators. For example, one or more operators may interact with the fleet coordinator 940 via a user interface provided by the fleet coordinator 940 to view, update, and take action with respect to status, health, and job information for the autonomous vehicles 101 and/or for groups of autonomous vehicles 101 within the fleet 905.

The interface 950 is configured to enable interactions between the fleet management system 915 and at least one external system 975 of an entity 970. The entity 970 may be a customer, partner, or other person or company/enterprise that receives, provides, or facilitates the provision of goods or services in connection with the autonomous vehicles 101. In an example embodiment, a computing device 980 of the entity 970 can view, update, and take action with respect to autonomous vehicles 101 and/or jobs/tasks associated with the entity 970 via the interface 950. For example, the interface 950 can provide a graphical user interface through which a customer, partner, or other entity 970 can view current status information regarding a pending or completed job, a particular autonomous vehicle 101 or group of autonomous vehicles 101, etc.

In addition to, or in lieu of, providing a user interface, the interface 950 can communicate with the computing device 980 to provide and/or collect information associated with the autonomous vehicles 101, jobs/tasks, etc. For example, the interface 950 can receive and answer questions from an operator of the computing device 980. The interface 950 may operate autonomously or via input from one or more operators of the fleet management system 915. For example, the interface 950 may provide a user interface through which one or more operators may interact to communicate with the external system 975.

Each computing device 980 includes a computer or processing system, such as a desktop, laptop, tablet, phone, or other mobile or non-mobile device. Each computing device 980 may include, for example, one or more types of displays (e.g., a screen or monitor) and input devices (e.g., a keyboard, mouse, voice recognition, etc.) to enter and/or view information. Each computing device 980 includes software 985, such as an internet browser or software application, through which the computing device 980 communicates with the interface 950.

Figure 10:
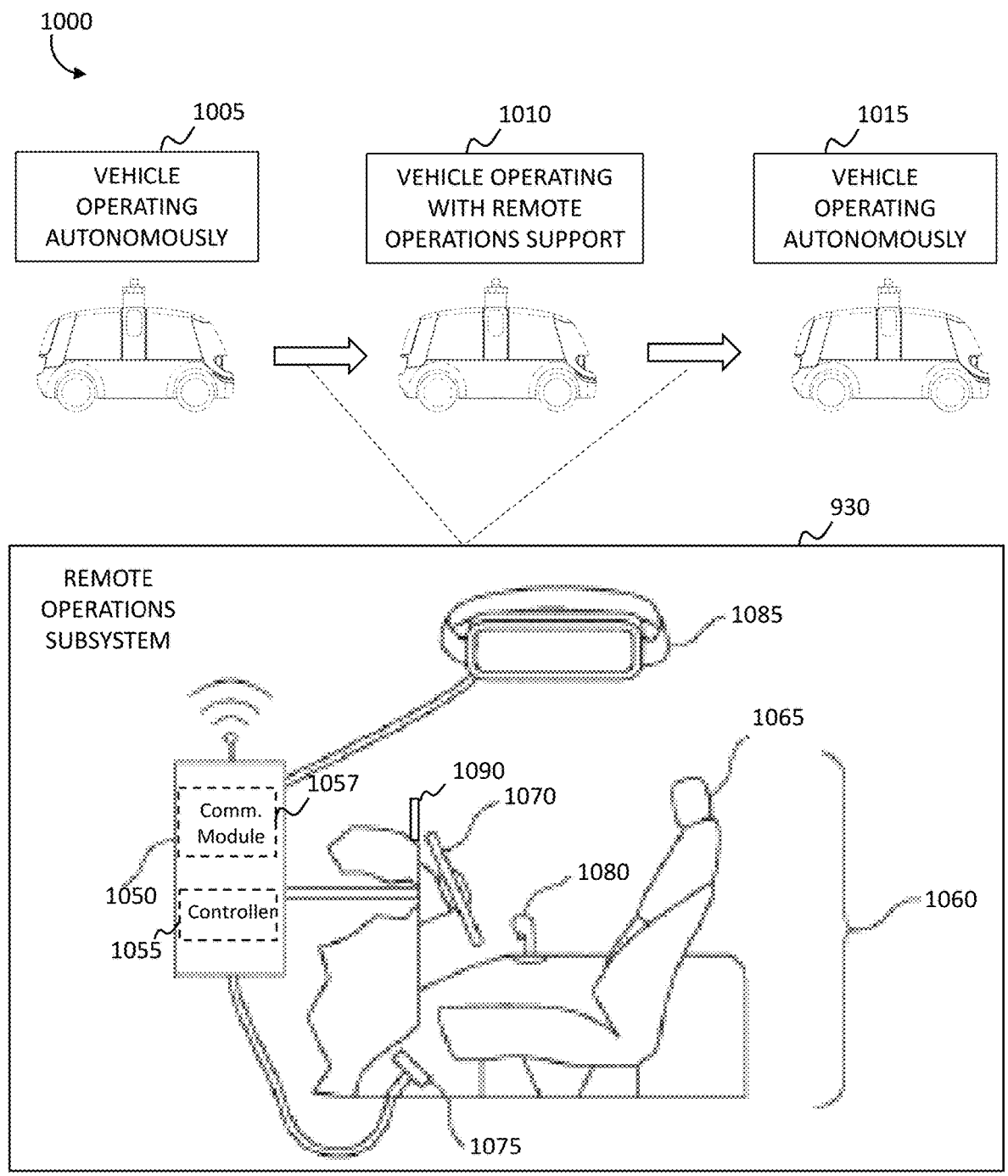
FIG. 10 is a diagram depicting a high-level operational flow of remote operations subsystem for providing remote operations for an autonomous vehicle, according to an example embodiment.

FIG. 10 is a diagram depicting an operational flow 1000 and remote operations subsystem 930 for providing remote assistance to an autonomous vehicle, according to an example embodiment. The remote operations subsystem 930 includes a computing device 1050 and a human operator station 1060. The human operator station 1060 includes components, which generally resemble a driver station in a typical vehicle. For example, the human operator station 1060 can include a driver seat 1065, a steering wheel 1070, brake and acceleration pedals 1075, and a gear shifter 1080. These components may be physically similar to corresponding components of a typical vehicle. For example, the driver seat 1065, steering wheel 1070, brake and acceleration pedals 1075, and gear shifter 1080 can have sizes and shapes that are generally in line with sizes and shapes of a driver seat, steering wheel, brake and acceleration pedals, and gear shifter, respectively, of a typical vehicle.

The human operator station 1060 also includes a visual interface 1085 configured to allow a human operator to view the autonomous vehicle and/or an environment in which the autonomous vehicle is operating. In an example embodiment, the visual interface 1085 includes a virtual-reality (VR) or augmented-reality (AR) headset. However, the visual interface 1085 is not limited to being a VR or AR headset. For example, in an alternative example embodiment, the visual interface 1085 can include one or more display screens, such as a light-emitting diode (LED), liquid crystal display (LCD), organic light-emitting diode (OLED) or other type of display now known or hereinafter developed.

The visual interface 1085 can be configured to display any number of different views of the autonomous vehicle and/or the environment of the autonomous vehicle, e.g., based on sensor (e.g., still image and/or video image) data provided by the autonomous vehicle or one or more objects or systems external to the autonomous vehicle, such as another autonomous vehicle in a fleet to which the autonomous vehicle belongs. For example, the visual interface 1085 can be configured to display front views, side views, rear views, overhead views, etc., of the autonomous vehicle and/or the environment of the autonomous vehicle based on the provided sensor data. The computing device 1050 and/or visual interface 1085 may include, e.g., one or more mechanisms for decoding the sensor data for display on the visual interface 1085, as appropriate. For example, the computing device 1050 can include one or more processors, memories, machine instructions, and/or hardware configured to decode packets or frames of image information from the autonomous vehicle and to reassemble the decoded packets or frames into an image for display via the visual interface 1085.

The human operator station 1060 can be configured to have an approximate touch response of an actual driver station in a vehicle. For example, the steering wheel 1070 may be configured to have a touch response that is similar to that of power steering in an actual vehicle, and the brake and acceleration pedals 1075 may be configured to approximate the resistance of brake and acceleration pedals in an actual vehicle. Thus, the human operator station 1060 may provide a configuration in which a human operator feels substantially like they would feel if they were actually located in the autonomous vehicle. In an example embodiment, the human operator station 1060 can include additional features, like speakers playing sounds from the autonomous vehicle, to further provide a realistic atmosphere for the human operator.

In an example embodiment, the human operator station 1060 can include one or more inputs 1090 configured to be selectively activated by a human operator to cause remote assistance (e.g., supervision/input or control) to be provided to the autonomous vehicle or to cease provision of remote assistance. Each of the inputs 1090 can include a physical eletromechanical input device, such as a button, switch, lever, pedal, or other device. For example, the inputs 1090 can include one or more buttons, which may be activated (e.g., by pressing, pushing, pulling, or the like) to change a state of the autonomous vehicle from an autonomous state to an assisted state or vice versa.

A human operator can activate the inputs 1090, e.g., based on information provided via the visual interface 1085. For example, if the human operator observes via the visual interface 1085 information indicating that remote assistance may be necessary or beneficial (e.g., to help the autonomous vehicle navigate an accident scene, a crossing guard, police directing traffic, a flashing crosswalk, a pothole, a construction zone, or another hazard, or to address a situational issue like a honking vehicle, emergency siren, tailgating vehicle, etc.), the human operator may active one of the inputs 1090 to, at least temporarily, seize control of the autonomous vehicle. In addition, or in the alternative, one or more other components of the human operator station 1060 may be configured to trigger or cease activation of one or more remote assistance functions. For example, an activation of the brake and acceleration pedals 1075 when an autonomous vehicle is operating in a fully autonomous mode may cause the autonomous vehicle to change to an assisted state without activation of one of the inputs 190.

The human operator station 1060 is operatively coupled to the computing device 1050. The computing device 1050 is a computer, server, or other computing device, which is configured to facilitate communications with, and/or operations involving, the autonomous vehicle, fleet management system subsystems, and/or one or more components of the human operator station 1060. The computing device 1050 includes one or more processors, memories, machine instructions, and/or hardware for processing and communicating information.

In an example embodiment, the computing device 1050 includes a communications module 1057 and the controller 1055. The communications module 1057 is configured to send and receive signals to and from the human operator station 1060, the autonomous vehicle, and the other subsystems of the fleet management system. The communications module 1057 can communicate using one or more different types of communications technologies such as Wi-Fi, cellular, wired communications, and/or other wired or wireless communication mechanisms now known or hereinafter developed.

The controller 1055 is configured to process signals from the communications module 1057 to enable remote assistance to be provided to the autonomous vehicle. For example, the controller 1055 can be configured to process signals from the human operator station 1060 and to translate the signals into control instructions for controlling the autonomous vehicle. In a teleoperations mode, for example, when a human operator turns or steers the steering wheel 1070, the controller 1055 can generate corresponding control instructions to be sent to the autonomous vehicle (via the communications module 1057) to instruct the autonomous vehicle to turn or drive in a direction corresponding to the turning/steering of the human operator. In addition, the controller 1055 can be configured to detect activation of one or more of the inputs 1090 and to cause a function associated with an activated input 1090 to be executed. For example, the controller 1055 can cause signals (e.g., instructions or information) to be sent to the autonomous vehicle (via the communications module 1057) to submit to a teleoperations mode, return to a (fully) autonomous mode, or take another action in response to detecting activation of one of the inputs 1090. In an example embodiment, the controller 1055 is further configured to process signals from the autonomous vehicle and/or other fleet management system subsystems to monitor behavior of the autonomous vehicle, e.g., for determining whether a need exists for remote assistance support and/or for confirming successful operation of one or more remote assistance functions.

The computing device 1050 can be connected to one or more of the components of the human operator station 1060 by one or more physical cables, intermediate devices, or other connections. In addition, or in the alternative, the computing device 1050 can be wirelessly coupled to one or more of the components of the human operator station 1060 using any suitable mechanism now known or hereinafter developed, such as Bluetooth or Wi-Fi. Each of the components of the human operator station 1060 can be substantially directly connected to the computing device 1050 or coupled to the computing device 1050 through one or more intermediate devices and/or networks, e.g., wireless and/or cellular networks.

In a first step 1005 of the example operation flow 1000, an autonomous vehicle is operating autonomously. For example, the autonomous vehicle may be turned on and sitting idle, traveling from a first location to a second location, or taking another action. In a second step 1010, the remote operations subsystem 930 provides remote assistance to the autonomous vehicle. For example, the remote operations subsystem 930 may take control over, and/or provide supervision/input to, the autonomous vehicle in response to a request for such action by the autonomous vehicle or based on a behavior or situation observed by the remote operations subsystem 930 and/or another subsystem of a fleet management system. For example, the remote operations subsystem 930 and/or other subsystem can observe the behavior or situation based on information (e.g., image data) provided by the autonomous vehicle or another object or system external to the autonomous vehicle, such as another autonomous vehicle in a fleet to which the autonomous vehicle belongs. Alternatively, a human operator can manually trigger a signal to the controller 1055 to cause remote assistance to be provided by pressing one of the inputs 1090.

After the remote operations subsystem 930 provides assistance in step 1010, the autonomous vehicle can return to a (potentially fully) autonomous mode of operation in step 1015. For example, the controller 1055 can cause remote assistance to cease in response to determining, e.g., based on signals from the autonomous vehicle, the human operator station 1060, and/or other subsystems of the fleet management system or another object or system external to the autonomous vehicle (e.g., another autonomous vehicle in the fleet), that there is no longer a need for remote assistance support. This determination may be made automatically by the controller 1055, autonomous vehicle, human operator station 1060, and/or subsystems, or the determination may be made with input from a human operator. For example, a human operator can manually trigger a signal to the controller 1055 to cause remote assistance to cease by pressing one of the inputs 1090.

Figure 11:
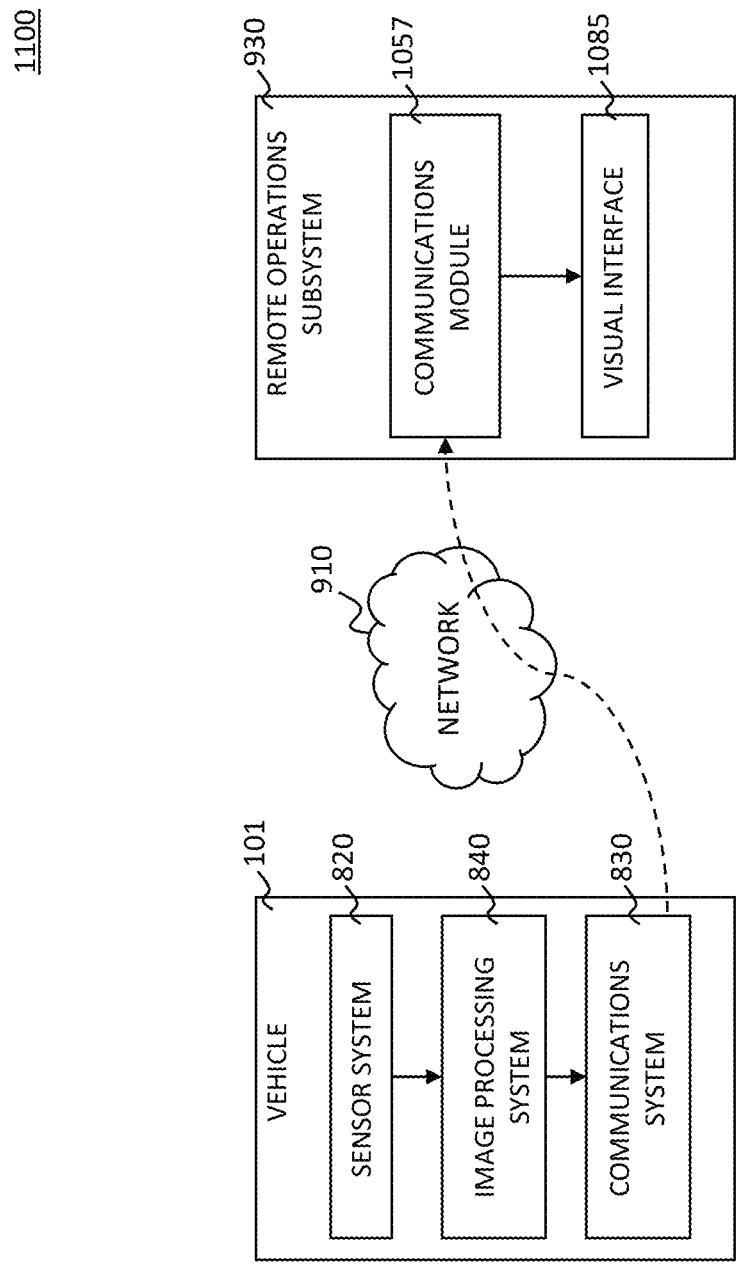
FIG. 11 is a diagram depicting a high-level operational flow for image quality enhancement for autonomous vehicle remote operations, according to an example embodiment.

FIG. 11 is a diagram depicting an operational flow 1100 for image quality enhancement for autonomous vehicle remote operations, according to an example embodiment. An autonomous vehicle 101 includes a sensor system 820, which captures image data (e.g., still images and/or video images), e.g., from one or more cameras of the sensor system 820. An image processing system 840 of the autonomous vehicle 101 processes the image data, e.g., to selectively enhance a quality of the images for transmission of the (enhanced) images to a remote operations subsystem 930. This processing may include, e.g., stitching together data from images captured by one or more different cameras in the sensor system (e.g., from cameras having different FOVs), blurring less important (or unimportant) regions and/or objects in the images to allow for an enhanced visual acuity for other (non-blurred) regions and/or objects, and/or applying quality settings for different pixel areas based on respective complexity and/or priority levels. Example operations for image quality enhancement by the image processing system 840 are described in more detail below.

A communications system 830 of the autonomous vehicle 101 provides the (encoded) image files to the remote operations subsystem 930 for processing via a network 910. As noted above with reference to FIG. 9, the network 910 can include any communications medium for transmitting information between two or more computing devices. For example, the network 910 can include a wireless local area network (WLAN) capability (e.g., cellular) or any other wireless or mobile communication capability now known or hereinafter developed. The image files can be transmitted, for example, in one or more packets and/or frames.

A communications module 1057 of the remote operations subsystem 930 receives the image files, decodes the image files (e.g., by decoding one or more packets and/or frames), and reassembles the decoded image files into a (still or video) image for display via a visual interface 1085. For example, a human operator using the remote operations subsystem 930 can view the displayed image and provide operational support for the autonomous vehicle 101 based on the displayed image.

Figure 12:
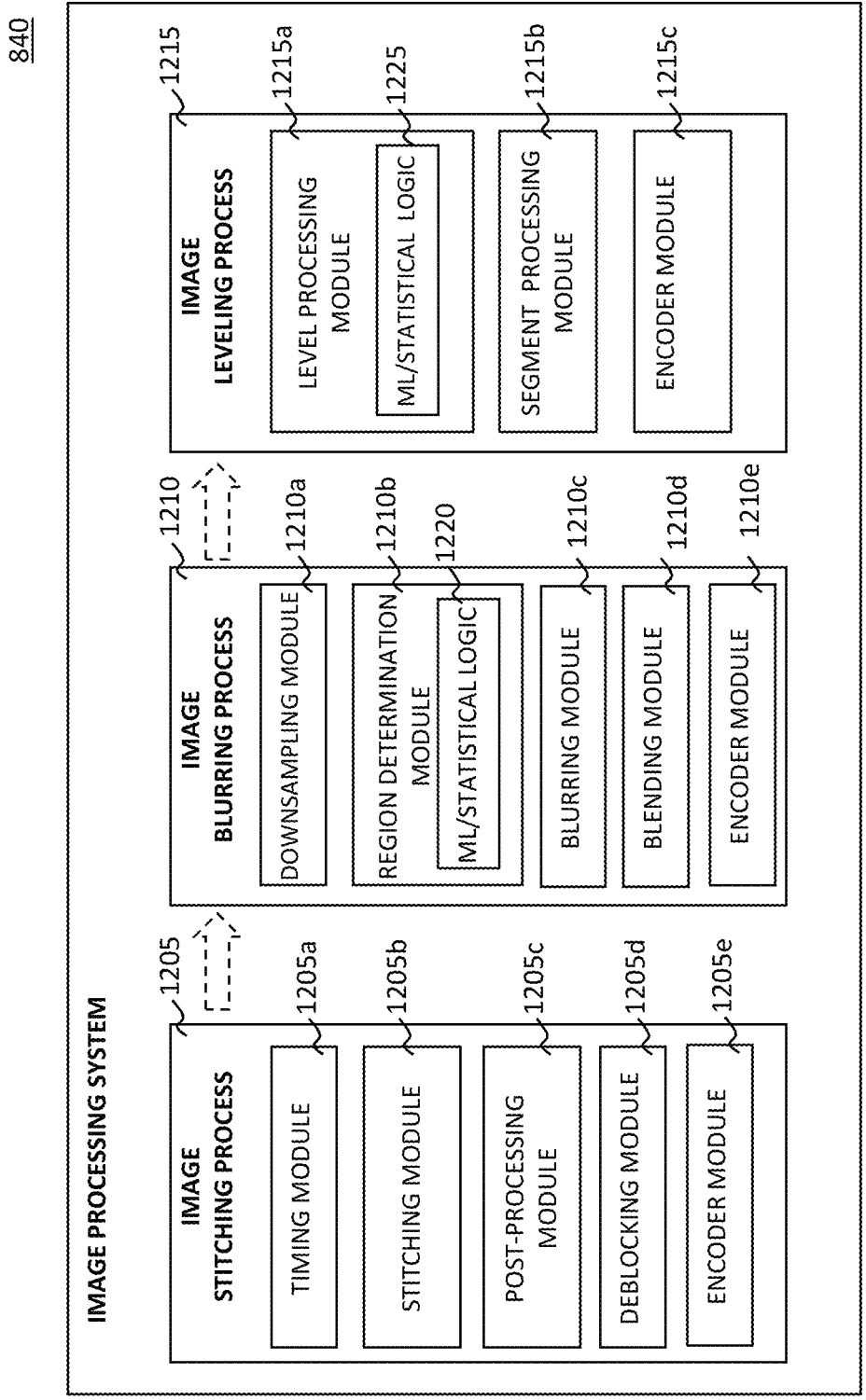
FIG. 12 is block diagram representation of functional components of an image processing system for image quality enhancement for autonomous vehicle remote operations, according to an example embodiment.

FIG. 12 is a block diagram representation of functional components of the image processing system 840, according to an example embodiment. The image processing system includes an image stitching process 1205 including modules configured to stitch together data from two or more images (e.g., images captured by cameras having different FOVs), an image blurring process 1210 including modules configured to blur less important (or unimportant) regions and/or objects in the images to allow for an enhanced visual acuity for other (non-blurred) regions and/or objects, and an image leveling process 1215 including modules configured to apply quality settings for different pixel areas based on respective complexity and/or priority levels. Each of the processes and modules can be embodied in hardware and/or software.

The image stitching process 1205 includes a timing module 1205a that is configured to substantially match a timing of two or more (still and/or video) images. For example, the images can include one or more images from each of one or more different cameras, e.g., in one or more different image capture pipelines. Each image can include, or be associated with, an image file or metadata or other mechanism for indicating a capture time (and/or capture time window) for the image. The timing module 1205a can obtain a capture time for each of the images and compare the images to match their respective timings, i.e., to match a particular image with at least one other image having a substantially same capture time. It should be appreciated that, when the image data includes video data, the cameras associated with the images may have different frame rates at which the images are captured, e.g., each camera may have a different frame capture rate measured in frames per second (FPS). The timing module 1205a can be configured to account for the frame rates when matching the timing of the images. For example, a precise timing mechanism can substantially minimize a scene shift between two different cameras and, hence, two different camera pipelines.

A stitching module 1205b is configured to stitch together, i.e., combine, pixels from the images. Stitching may involve, e.g., replacing at least a portion of pixels from a first of the images with at least a portion of pixels from a second (or more) of the images to create a combined image. For example, stitching may involve replacing certain pixels from a first camera having a larger FOV (and/or lower resolution) with pixels from a second camera having a smaller FOV (and/or higher resolution). This can, for example, allow the combined image to include an overall FOV corresponding to the (larger) FOV of the first camera, with an enhanced visual acuity for an area corresponding to the (smaller) FOV of the second camera. In addition, or in the alternative, stitching may involve adding one or more images to another image, for example, at a side or edge of the image, to create a panoramic overall image. An example stitching operation is described in more detail below, with reference to FIG. 13.

A post-processing module 1205c and a deblocking module 1205d are collectively configured to refine the combined image to provide a cohesive, "clean" overall image. For example, the post-processing module 1205c can create balance in the combined image, e.g., by balancing data associated with an exchangeable image file format (EXIF), such as an exposure, black and white balance, color temperature, etc. The balancing may be based, for example, on captured metadata associated with images. The deblocking module

1205*d* can be configured to apply one or more filters (such as, but not limited to, a linear deblocking filter) on one or more edges of the stitched portion of the combined image to mitigate blockiness and sharp edges, i.e., to ensure the combined pixels blend together.

An encoder module 1205*e* is configured to encode the (processed) combined image, e.g., to encode one or more data segments representing the combined image so that areas of the combined image with higher visual acuity (e.g., a portion of the combined image stitched from a camera having a smaller FOV and/or higher resolution than another portion of the combined image) are enhanced and/or better preserved as compared to other areas of the combined image. Encoding may be performed, for example, such that wide visual angles for larger or wider FOV portions of the combined image are maintained while preserving a higher visual acuity in smaller FOV portions of the image. For example, the encoder module 1205*e* can include one or more encoder processes, that the encoder module 1205*e* can select and/or configure, as appropriate, to enhance and/or preserve these areas of the combined image.

The image blurring process 1210 includes a downsampling module 1210*a* configured to analyze an image, e.g., a combined image from the image stitching process 1205 and adjust a size of the image as appropriate. For example, the downsampling module 1210*a* can be configured to crop or otherwise adjust the size of the image as appropriate for process and/or encoding purposes, e.g., by adjusting the size of the image to correspond to a display size for a visual interface of a human operator station of a remote operations system. The display size may be based on an available bandwidth. As may be appreciated, downsampling may reduce computational complexity and/or a required bitrate for the image. The downsampling module 1210*a* can adjust the image, for example, based on data related to image, such as historical information from one or more logs or other databases or data stores associated with the autonomous vehicle and/or autonomous vehicle fleet (e.g., the database 850 describe above with reference to FIG. 8).

A region determination module 1210*b* is configured to identify less important (or unimportant) regions and/or objects in the image. For example, the region determination module 1210*b* can include, and/or reference, one or more machine learning and/or statistical logic mechanisms 1220 for determining a degree of importance for one or more regions and/or objects in the image. The degree of importance may be binary, i.e., either important or unimportant, or it may include multiple gradations on a scale between important and unimportant (e.g., unimportant, less important, moderately important, important, etc.).

The machine learning and/or statistical logic mechanisms 1220 can include, for example, one or more trained computer vision models or other logic for comparing regions and/or objects in the image to known regions and/or objects, which have known and/or projected levels of importance with regard to autonomous vehicle remote operations. For example, the machine learning and/or statistical logic mechanisms 1220 can compare the image to known images of skylines, trees, leaves, bugs, dust, walls, stationary objects in yards, and/or other environmental elements, which are not material to operation of the autonomous vehicle, to determine the presence of any such (less important or unimportant) elements in the image.

A blurring module 1210*c* is configured to apply one or more techniques to effectively blur, or reduce the resolution of, any less important or unimportant regions and/or objects in the image. For example, the blurring module 1210*c* may selectively apply a Gaussian smoothing algorithm, one or more filters, and/or one or more other mechanisms to blur the less important or unimportant regions and/or objects (and not the more important regions and/or objects) in the image. As may be appreciated, a blurring level, i.e., a degree to which a region and/or object is blurred, may vary for different regions and/or objects. For example, a blurring level may be dynamically adjusted based on a complexity of the region and/or object and a degree to which the region and/or object is considered to be less important (or unimportant). Moreover, the blurring level may vary based on an available bit rate, bandwidth consideration, or otherwise. A blending module 1210*c* is configured to apply one or more blending mechanisms (e.g., a gradient descent blending) to edges of any (blurred) less important or unimportant regions and/or objects in the image. For example, the blending may mitigate blockiness and sharp edges, e.g., to ensure pixels for blurred and non-blurred portions of the image blend together.

An encoder module 1210*e* is configured to encode the (blended) image, e.g., to encode one or more data segments representing the image so that areas of the image with higher visual acuity (e.g., a non-blurred portion of the image) are enhanced and/or better preserved as compared to other areas of the image. For example, the encoder module 1210*e* can include one or more encoder processes, which the encoder module 1210*e* can select and/or configure, as appropriate, to enhance and/or preserve these areas of the image.

The image leveling process 1215 includes a level processing module 1215*a* configured to identify one or more complexity levels in an image (e.g., a raw image, a combined image, and/or a blended image). Each complexity level corresponds to one or more encoding quality settings for a respective set of pixels (a "pixel area") in the image. For example, complexity levels can be associated with priority levels, with higher priority pixel areas generally being associated with one or more higher quality settings than lower priority pixel areas. The level processing module 1215*a* can determine the complexity levels and identify the pixel areas for each complexity level.

In an example embodiment, the level processing module 1215*a* can include, and/or reference, one or more machine learning and/or statistical logic mechanisms to identify the complexity levels and pixel areas in the image. The machine learning and/or statistical logic mechanisms 1225 can include, for example, one or more trained computer vision models or other logic for comparing the image to known scenes for which relative priorities and/or quality settings may be associated. For example, the machine learning and/or statistical logic mechanisms 1225 can compare the image to data regarding known scenes (e.g., scenes of particular traffic patterns, pedestrian behaviors, construction zones, skylines, road surfaces, foliage, etc.), to identify respective complexities and/or priorities of pixel areas in the image.

As may be appreciated a granularity of the complexity levels may vary, e.g., based on an available bit rate, bandwidth consideration, or otherwise. For example, only one or a few complexity levels (such as a high complexity level and a low complexity level) can be used with respect to certain scenes or for certain applications, while many complexity levels can be used for certain other scenes or applications. For example, a relatively simple complexity level scheme may involve identifying a substantially central region of an image as a first pixel area with a higher priority complexity level, and a surrounding region of the image as a second pixel area with a lower priority complexity level. The pixel areas and/or complexity levels may be identified, for example, so that bit rate fluctuation can be substantially minimized and/or so that pixel areas to be encoded with relatively high quality may be substantially minimized.

A segment processing module 1215b is configured to divide the image into segments based on the pixel areas. Each segment may include data related to all of, or part of, a pixel area. An encoder module 1215c is configured to encode the segments so that higher priority pixel areas are enhanced and/or better preserved (encoded with a higher quality) as compared to lower priority pixel areas that are encoded with a lower quality. For example, the encoder module 1210c can include one or more encoder processes, which the encoder module 1215c can select and/or configure, as appropriate, to enhance and/or preserve the higher priority pixel areas. The encoder module 1210c may determine encoder settings associated with each complexity level and configure the encoder processes accordingly. For example, the encoder module 1210c may define two or more levels of encoding with two or more different video encoder settings, with each of the levels and/or settings corresponding to a respective complexity level. In an example embodiment, multiple encoders may be configured to operate in parallel so that multiple segments can be encoded substantially simultaneously. As will be appreciated, segments may be queued for encoding.

Figure 13:
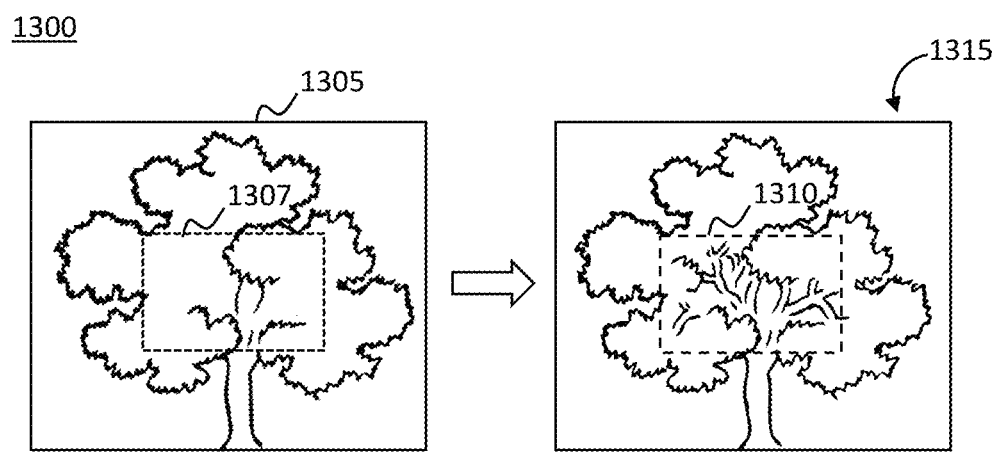
FIG. 13 is a diagram illustrating a stitching operation for image quality enhancement for autonomous vehicle remote operations, according to an example embodiment.

FIG. 13 is a diagram illustrating a stitching operation 1300 for image quality enhancement for autonomous vehicle remote operations, according to an example embodiment. The stitching operation 1300 can be completed, e.g., by an image stitching process, such as the image stitching process 1205 described above with reference to FIG. 12. A first image 1305 including a first pixel area 1307 is captured from a first camera. A second image including a second pixel area 1310 is captured from a second camera. The first camera has a larger FOV, and therefore a lower resolution or pixel density, than the second camera. Therefore, the first image 1305, including the pixel area 1307, is less detailed, or less clear, than the pixel area 1310.

To enhance a visual acuity with respect to the first image 1305, an image processing system can be configured to complete the stitching operation 1300 to effectively stitch the second pixel area 1310 into the first image 1305, in place of the first pixel area 1305, thereby creating a combined image 1315. The combined image 1315 includes the second pixel area 1310 and portions of the first image 1305 substantially outside of the first pixel area 1307. For example, the replacement of the pixels in the first pixel area 1305 can be accomplished using graphics processing unit (GPU) computations to identify the area in the first image 1305 that may essentially be replaced by the second pixel area 1310. The replacement of the pixels also may generally involve calibration and optimization based upon the characteristics of the images and/or pixel areas.

As may be appreciated, the sizes, locations, shapes, and configurations of the first pixel area 1307, second pixel area 1310, and combined image 1315 are illustrative and can vary in alternative example embodiments. For example, while the operation 1300 involves replacing a substantially centrally disposed, rectangular first pixel area 1307 with a more detailed, rectangular second pixel area 1310, the first pixel area 1307 and second pixel area 1310 may have any suitable size, location, or shape. Moreover, it should be appreciated that, while the operation 1300 involves replacement of one pixel area (i.e., the first pixel area 1307), more than one pixel area may be replaced (e.g., using one or more images from one or more different cameras) to create the combined image 1315 in alternative example embodiments.

Figure 14:
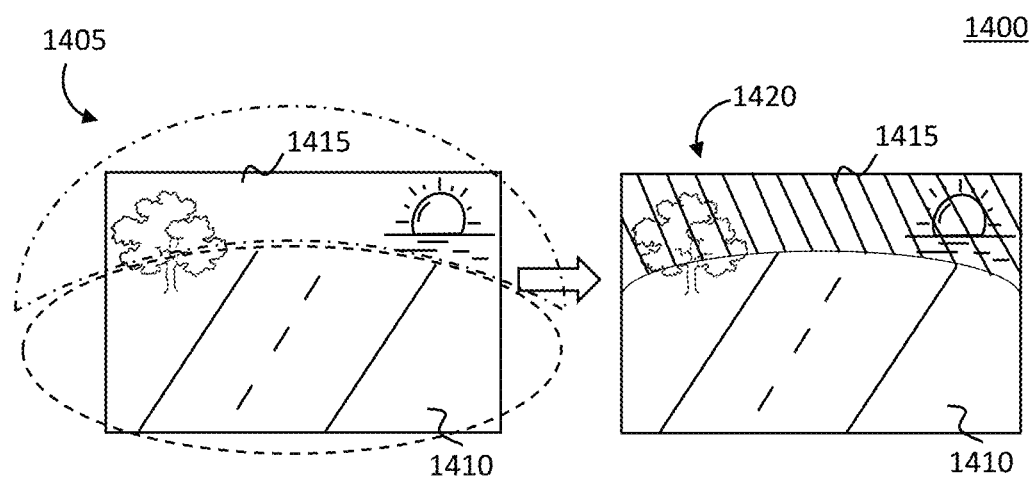
FIG. 14 is a diagram illustrating a blurring operation for image quality enhancement for autonomous vehicle remote operations, according to an example embodiment.

FIG. 14 is a diagram illustrating a blurring operation 1400 for image quality enhancement for autonomous vehicle remote operations, according to an example embodiment. The blurring operation 1400 can be completed, e.g., by an image blurring process, such as the image blurring process 1210 described above with reference to FIG. 12. An image 1405 includes a first region 1410 and a second region 1415. The image blurring process has identified each of the first region 1410 and the second region 1410 and determined that the second region 1415 is less important (or unimportant), while the first region 1410 is important (or at least more important than the second region 1415). For example, in the context of an autonomous vehicle (such as the autonomous vehicle 101), the image blurring process can identify (e.g., using one or more machine learning and/or statistical logic mechanisms) the first region 1410 as including a (more important) roadway and the second region 1415 as including a (less important) skyline and/or tree-line. Other example regions and/or objects, which may be considered more important or less important in this context will be apparent to a person of ordinary skill in the art.

The image blurring process has applied one or more techniques to create a blurred image 1420, which effectively blurs, or reduces the resolution of, the second region 1415, while retaining a clarity and resolution for the first region 1410. It should be appreciated that the sizes, locations, shapes, and configurations of the first region 1410, second region 1415, image 1405, and blurred image 1420 are illustrative and can vary in alternative example embodiments. For example, while the operation 1400 generally involves application of an arc-shaped blurring across a top of the image 1405, the blurring can have any shape spanning any of one or more portions of the image 1405. Moreover, while the operation 1400 involves blurring of a region, namely the second region 1415, it should be appreciated that the blurring could involve one or more objects (e.g., a tree, sun, or other object), with or without blurring a region of the image 1405.

Figure 15A:
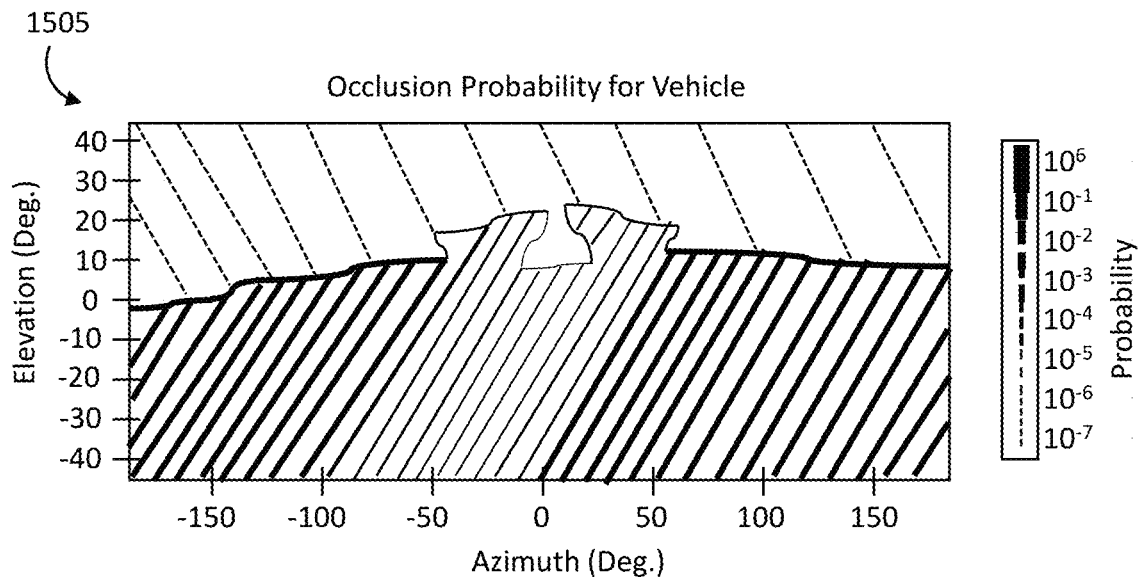
FIGS. 15A and 15B are diagrams illustrating heat maps, which may be used in an operation for refining a blurring operation for image quality enhancement for autonomous vehicle remote operations, according to an example embodiment.
Figure 15B:
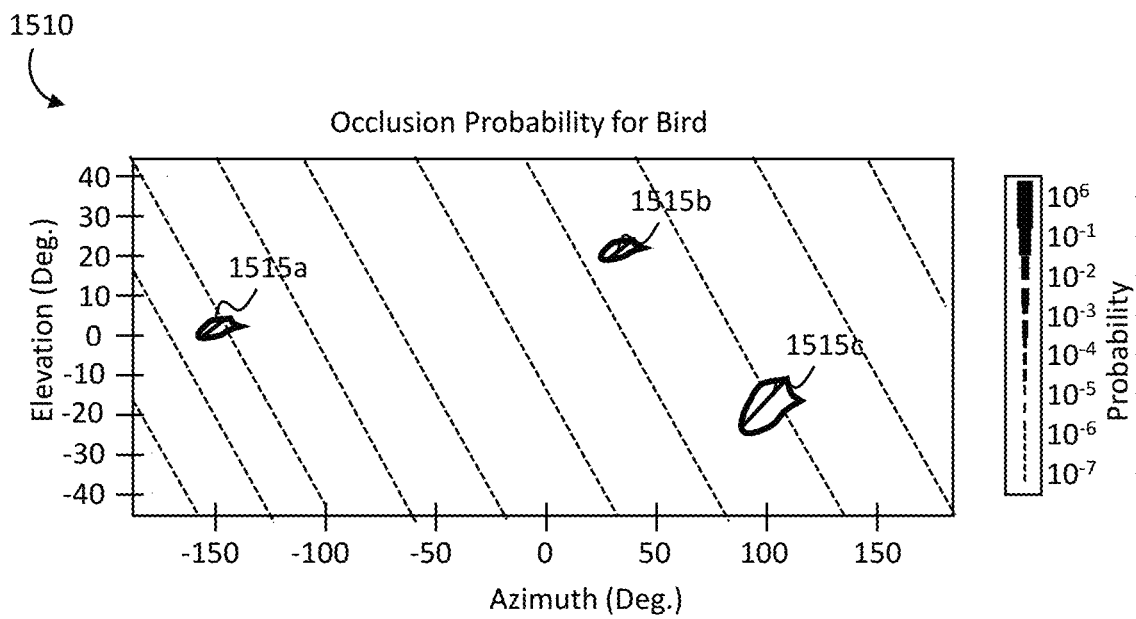

FIGS. 15A and 15B are diagrams illustrating heat maps 1505 and 1510, respectively, which may be used in an operation for refining a blurring operation for image quality enhancement for autonomous vehicle remote operations, according to an example embodiment. The operation can be completed, e.g., by an image blurring process, such as the image blurring process 1210 described above with reference to FIG. 12. Each heat map (1505, 1510) includes a probability that a particular object will be present in a particular location of an image, e.g., when the image is displayed to a human operator.

For example, the image blurring process can compute the heat maps using one or more machine learning and/or statistical logic mechanisms. The machine learning and/or statistical logic mechanisms can, e.g., compare an image (e.g., a raw, combined, or blurred image) with known regions and/or objects (which can, e.g., have known and/or projected levels of importance with regard to autonomous vehicle remote operations) to probabilistically determine how likely each region and/or object is to show up in particular locations of the image. For example, the heat map 1505 indicates relative probabilities for whether a vehicle will be present in particular locations of an image, and the heat map 1510 indicates relative probabilities for whether a bird will be present in particular locations of an image. In particular, the heat map 1505 shows a relatively high likelihood of a vehicle being located in the image, in an area substantially below an elevation of zero degrees, with varying degrees of probability across an azimuth range. In contrast, the heat map 1505 shows a relatively low likelihood of a bird being located in the image, except for three regions 1505a, 1505b, and 1505c, which have higher probabilities of including a bird. As may be appreciated, the sizes, shapes, and configurations of the heat maps 1505 and 1510, and the probability regions in the heat maps 1505 and 1510, are illustrative and can vary in alternative example embodiments.

In an example embodiment, the image blurring process can use information in the heat maps 1505 and 1510 to adjust one or more blurring regions in a blurred image, such as the image 1420 described above with reference to FIG. 14. For example, the image blurring process can adjust a shape of a blurring region (e.g., the second region depicted in the image 1420) so that it covers substantially all (or most) of any areas where object of interest are unlikely to appear, and adjust gradients towards any areas where object of interest are likely to appear.

Figure 16:
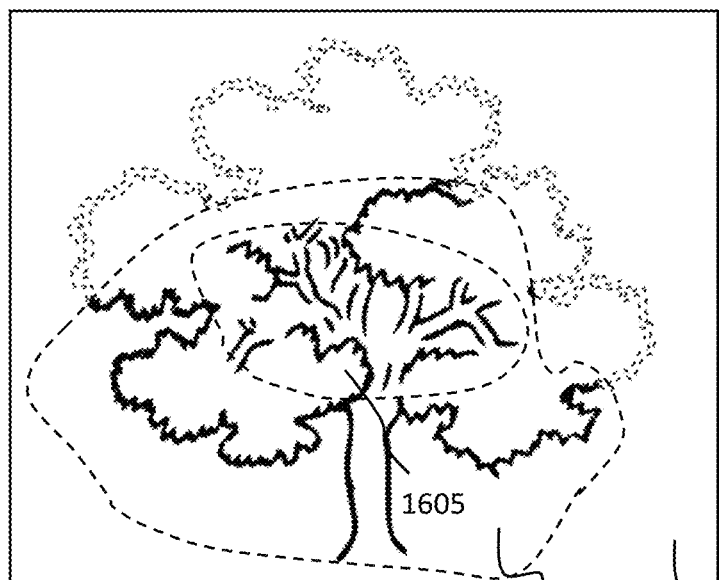
FIG. 16 is a diagram illustrating an enhanced combined image generated using techniques for image quality enhancement for autonomous vehicle remote operations, according to an example embodiment.

FIG. 16 is a diagram illustrating an enhanced combined image 1600 generated using techniques for image quality enhancement for autonomous vehicle remote operations, according to an example embodiment. For example, image blurring process, such as the image blurring process 1210 described above with reference to FIG. 12, can create the enhanced combined image 1600 by blurring a combined image, such as the combined image 1315 described above with reference to FIG. 13. The blurring can include, for example, one or more of the operations described above with reference to FIGS. 14 and 15.

The enhanced combined image 1600 includes a first pixel area 1605 from a first camera, which has been stitched together with one or more pixel areas from one or more other cameras to form the combined image 1600. For example, the first pixel area 1605 can include pixels from an image with a higher pixel density and/or resolution than other portions of the combined image 1600, including a second pixel area 1610. For example, the first pixel area 1605 can correspond to a first camera that has a larger FOV than a second camera corresponding to the second pixel area 1610.

Blurring has been applied to a region 1615, effectively blurring, or reducing the resolution of, the region 1615, while retaining a clarity and resolution for the first pixel area 1605 and the second pixel area 1610. It should be appreciated that the sizes, locations, shapes, and configurations of the first pixel area 1605, second pixel area 1610, region 1615, and combined enhanced image 1600 are illustrative and can vary in alternative example embodiments.

Figure 17:
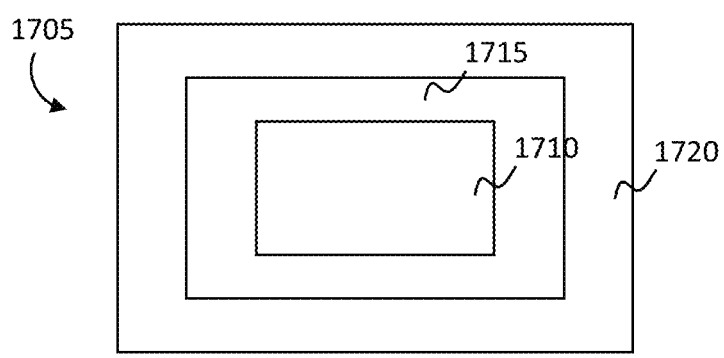
FIG. 17 is a diagram illustrating a leveling operation for image quality enhancement for autonomous vehicle remote operations, according to an example embodiment.

FIG. 17 is a diagram illustrating a leveling operation 1700 for image quality enhancement for autonomous vehicle remote operations, according to an example embodiment. The leveling operation 1700 can be completed, e.g., by an image leveling process, such as the image leveling process 1215 described above with reference to FIG. 12. In the operation 1700, an image 1705 (e.g., a raw image, a combined image, and/or a blended image) has been determined to include three pixel areas, namely, a first pixel area 1710, a second pixel area 1715, and a third pixel area 1720. Each of the pixel areas is associated with a corresponding complexity level. For example, the first pixel area 1710 may be associated with a relatively high complexity level that is to be encoded at a relatively high (e.g., a finer) quality level, the second pixel area 1715 may be associated with a relatively medium complexity level that is to be encoded at a relatively mid-quality level, and the third pixel area 1720 may be associated with a relatively low complexity level that is to be encoded at a relatively low (e.g., a coarser) quality level. The pixel areas may or may not correspond, for example, to different pixel areas and/or regions in a combined enhanced image, such as the combined enhanced image 1600.

It should be appreciated that the sizes, locations, shapes, and configurations of the first pixel area 1710, second pixel area 1715, third pixel area 1720, and image 1705 are illustrative and can vary in alternative example embodiments.

Figure 18:
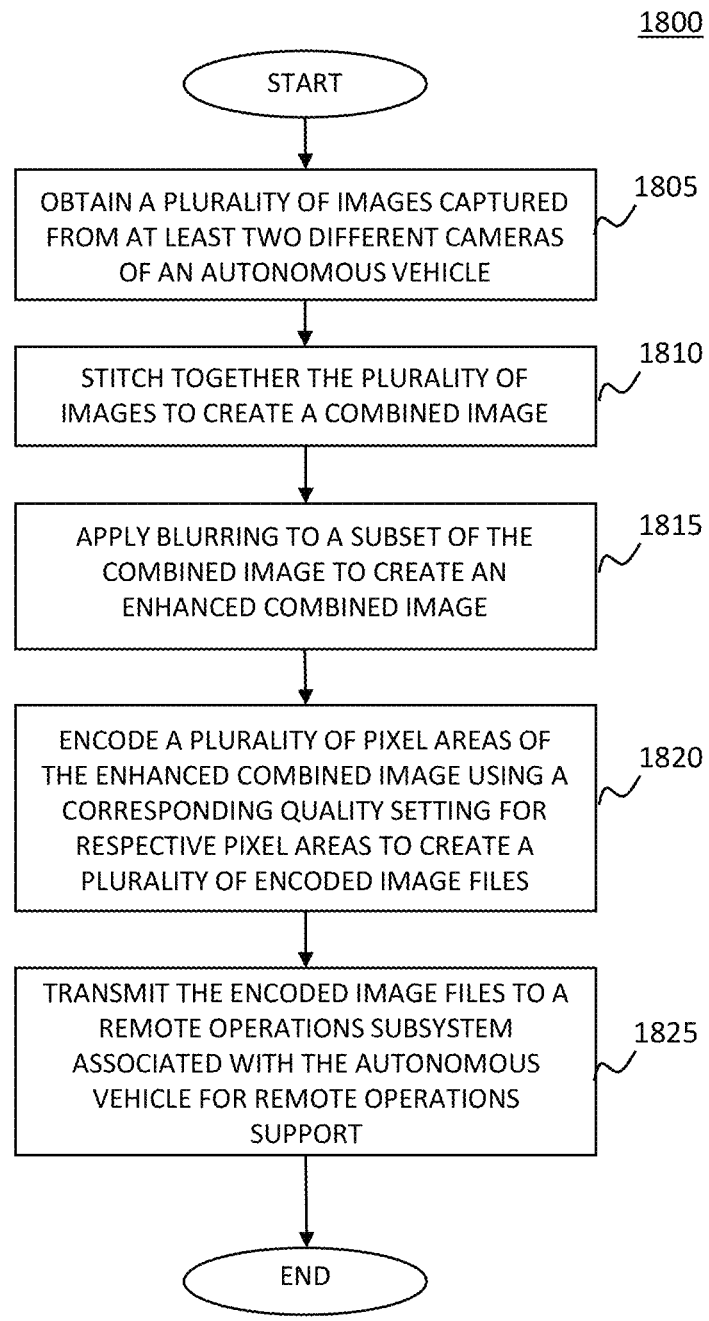
FIG. 18 is a flow chart of a method for providing image quality enhancement for facilitating remote operations for autonomous vehicles, according to an example embodiment.

FIG. 18 is a flow chart of a method 1800 for providing image quality enhancement for facilitating remote operations for autonomous vehicles, according to an example embodiment. In step 1805, an image processing system obtains a plurality of images captured from at least two different cameras of an autonomous vehicle. The cameras may include, e.g., one or more cameras mounted on a body of the autonomous vehicle, such as the cameras 250a-250j described above with reference to FIG. 2. The image processing system can include, e.g., an image processing system of the autonomous vehicle, such as the image processing system 840 described above with reference to FIG. 8. Each of the images can include a still image and/or a video image.

In step 1810, the image processing system stitches together the plurality of images to create a combined image. For example, an image stitching process of the image processing system can be configured to match a capture timing for each of the images and combine pixels from the (matched) images to form the combined image. Combining the pixels may involve, e.g., replacing at least a portion of pixels in a first image with at least a portion of pixels from each of one or more other images. An example method for creating a stitched image is described in more detail below with reference to FIG. 19.

In step 1815, the image processing system applies blurring to a portion of the combined image to create an enhance combined image. For example, an image blurring process of the image processing system can be configured to identify any less important (or unimportant) regions and/or objects in the image (e.g., using one or more machine learning and/or statistical logic mechanisms) and apply one or more techniques to effectively blur, or reduce the resolution of, the less important or unimportant regions and/or objects in the image. An example method for applying selective blurring to an image is described in more detail below with reference to FIG. 20.

In step 1820, the image processing system encodes a plurality of pixel areas of the enhanced combined image using a corresponding quality setting for respective pixel areas to create a plurality of encoded image files. For example, an image leveling process of the image processing system can be configured to identify one or more complexity levels in the enhanced combined image (e.g., using machine learning and/or statistical logic mechanisms) where each complexity level corresponds to one or more encoding quality settings for a respective pixel area. An example method for leveled video encoding is described in more detail below with reference to FIG. 21. In step 1825, the image processing system transmits the encoded image files to a remote operations subsystem associated with the autonomous vehicle for remote operations support.

Figure 19:
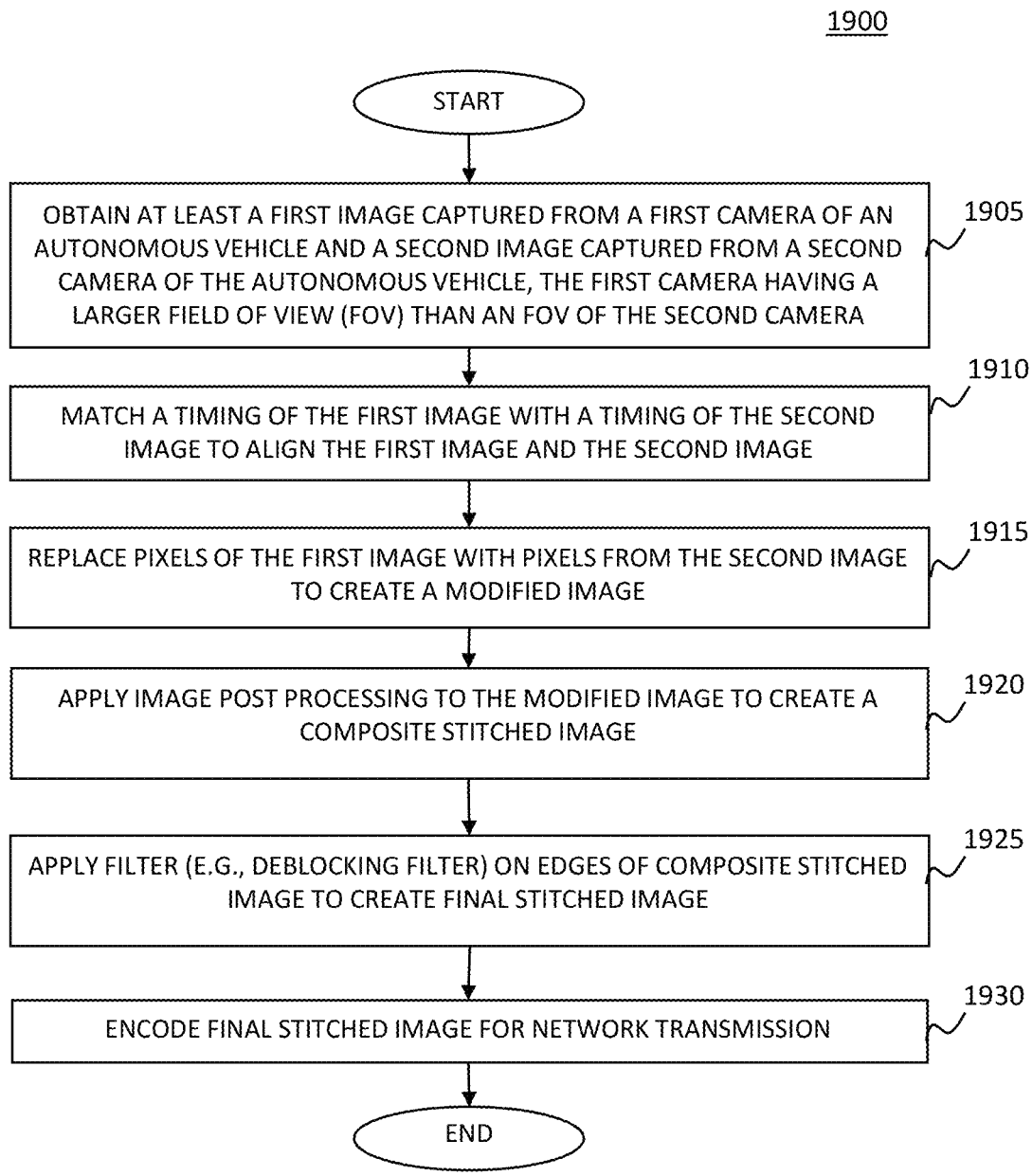
FIG. 19 is a flow chart of a method for creating a stitched image for image quality enhancement for autonomous vehicle remote operations, according to an example embodiment.

FIG. 19 is a flow chart of a method 1900 for creating a stitched image for image quality enhancement for autonomous vehicle remote operations, according to an example embodiment. In step 1905, an image processing system obtains at least a first image captured from a first camera of an autonomous vehicle and a second image captured from a second camera of the autonomous vehicle. The cameras may include, e.g., one or more cameras mounted on a body of the autonomous vehicle, such as the cameras 250a-250j described above with reference to FIG. 2. The image processing system can include, e.g., an image processing system of the autonomous vehicle, such as the image processing system 840 described above with reference to FIG. 8. Each of the images can include a still image and/or a video image. The first camera has a larger FOV than an FOV of the second camera. As a result, the first image, may have a lower pixel density than a pixel density of the second image.

In step 1910, a timing module of an image stitching process of the image processing system matches a timing of the first image with a timing of the second image to align the first image with the second image. For example, the images can include one or more images from each of one or more different cameras, e.g., in one or more different image capture pipelines. Each image can include, or be associated with, an image file or meta data or other mechanism for indicating a capture time (and/or capture time window) for the image. The timing module can obtain a capture time for each of the images and compare the images to match their respective timings, i.e., to match the first image with the second image. It should be appreciated that, when the images include video images, the cameras associated with the images may have different frame rates at which the images are captured, e.g., each camera may have a different frame capture rate. The timing module can be configured to account for the frame rates when matching the timing of the images. For example, a precise timing mechanism can substantially minimize a scene shift between two different cameras and, hence, two different camera pipelines.

In step 1915, a stitching module of the image stitching process replaces pixels of the first image (e.g., a portion of the first image) with pixels from the second image (e.g., all or a portion of the second image) to create a modified image. For example, replacing certain pixels from the first camera having the larger FOV with pixels from the second camera having the smaller FOV can allow the modified image to include an overall FOV corresponding to the (larger) FOV of the first camera, with an enhanced visual acuity for an area corresponding to the (smaller) FOV of the second camera.

In step 1920, a post-processing module of the image stitching process applies image post-processing to the modified image to create a composite stitched image. For example, the post-processing module can create balance in the combined image, e.g., by balancing data associated with an exchangeable image file format (EXIF), such as an exposure, black and white balance, color temperature, etc. The balancing may be based, for example, on capture metadata associated with images.

In step 1925, a deblocking module of the image stitching process applies one or more filters (such as, but not limited to, a linear deblocking filter) on one or more edges of the composite stitched image (e.g., at the stitched portion of the composite stitched image) to create a final stitched image. The filters are configured to mitigate blockiness and sharp edges, i.e., to ensure the combined pixels blend together in the final stitched image.

In step 1930, an encoder module of the image stitching process encodes the final stitched image for network transmission. For example, the encoder module can encode one or more data segments representing the final stitched image so that areas of the final stitched image with higher visual acuity (e.g., a portion of the final stitched image stitched from the second camera having the smaller FOV) are enhanced and/or better preserved as compared to other areas of the final stitched image. Encoding may be performed, for example, such that wide visual angles for larger or wider FOV portions of the final stitched image are maintained while preserving a higher visual acuity in smaller FOV portions of the image. For example, the encoder module can include one or more encoder processes, which the encoder module can select and/or configure, as appropriate, to enhance and/or preserve these areas of the image.

Figure 20:
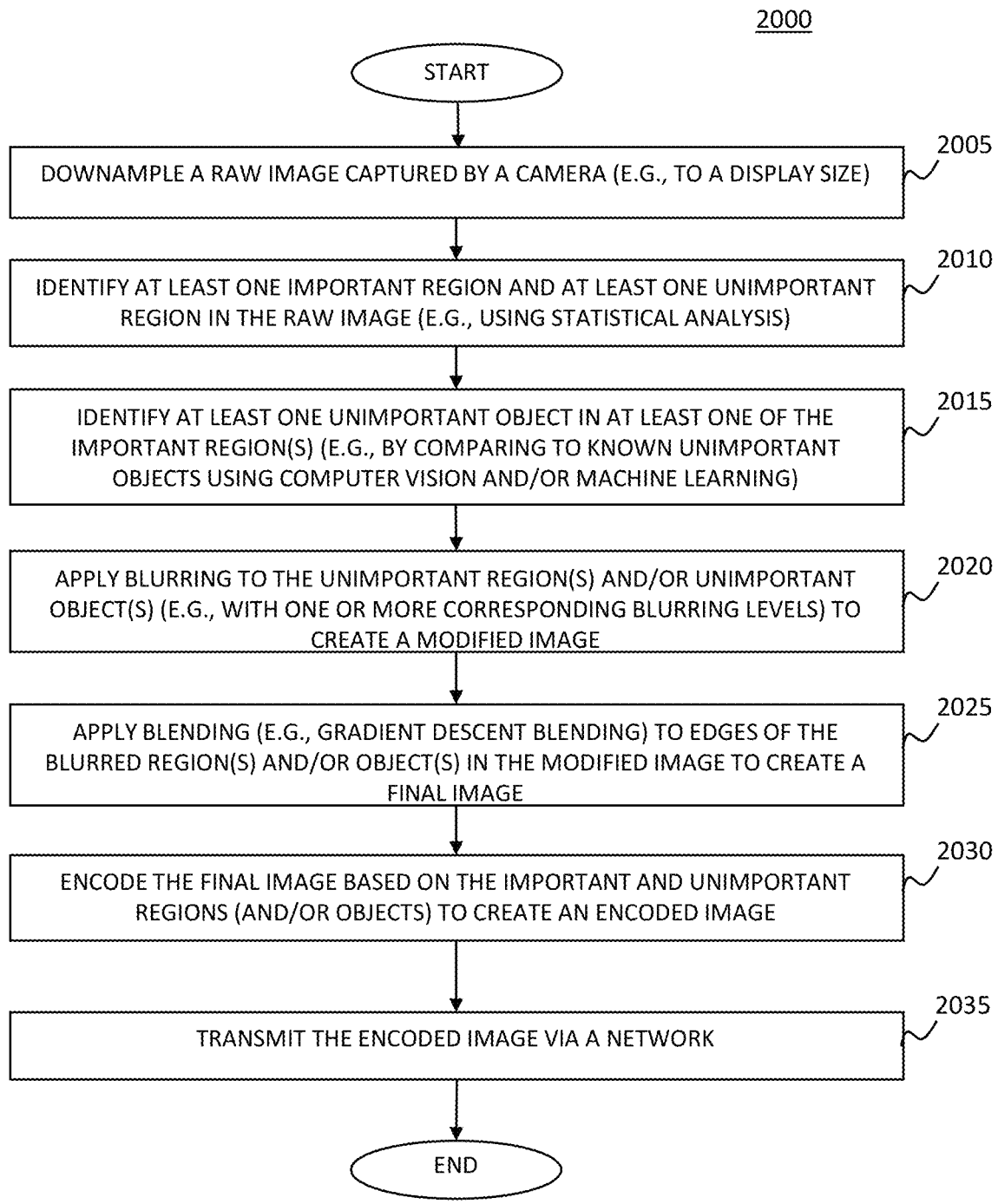
FIG. 20 is a flow chart of a method for applying selective blurring to an image for image quality enhancement for autonomous vehicle remote operations, according to an example embodiment.

FIG. 20 is a flow chart of a method 2000 for applying selective blurring to an image for image quality enhancement for autonomous vehicle remote operations, according to an example embodiment. In step 2005, a downsampling module of an image blurring process of an image processing system downsamples a raw image captured by a camera. The camera may include, e.g., a camera mounted on a body of an autonomous vehicle, such as one of the cameras 250a-250j described above with reference to FIG. 2. The image processing system can include, e.g., an image processing system of the autonomous vehicle, such as the image processing system 840 described above with reference to FIG. 8. The raw image can include a still image and/or a video image. The downsampling module downsamples the raw image by cropping or otherwise adjusting the size of the image as appropriate for process and/or encoding purposes, e.g., by adjusting the size of the image to correspond to a display size for a visual interface of a human operator station of a remote operations system. The display size may be based on an available bandwidth. As may be appreciated, downsampling may reduce computational complexity and/or a required bitrate for the image.

In step 2010, a region determination module of the image blurring process identifies at least one important region and at least one unimportant region in the raw image. For example, the region determination module can include, and/or reference, one or more machine learning and/or statistical logic mechanisms for determining a degree of importance for one or more regions in the image. The degree of importance may be binary, i.e., either important or unimportant, or it may include multiple gradations on a scale between important and unimportant (e.g., unimportant, less important, moderately important, important, etc.). The machine learning and/or statistical logic mechanisms can include, for example, one or more trained computer vision models or other logic for comparing regions in the image to known regions, which have known and/or projected levels of importance with regard to autonomous vehicle remote operations.

In step 2015, the region determination module of the image blurring process identifies at least one important object in at least one of the important region(s). For example, the region determination module can include, and/or reference, one or more machine learning and/or statistical logic mechanisms for determining a degree of importance for one or more objects in the image. These machine learning and/or statistical logic mechanisms may be the same or different from the machine learning and/or statistical logic mechanisms used to identify the important and unimportant regions in the image. The degree of importance may be binary, i.e., either important or unimportant, or it may include multiple gradations on a scale between important and unimportant (e.g., unimportant, less important, moderately important, important, etc.). The machine learning and/or statistical logic mechanisms can include, for example, one or more trained computer vision models or other logic for comparing objects in the image to known objects, which have known and/or projected levels of importance with regard to autonomous vehicle remote operations. For example, the machine learning and/or statistical logic mechanisms can compare the image (and/or a portion thereof) to known images of skylines, trees, leaves, bugs, dust, walls, stationary objects in yards, and/or other environmental elements, which are not material to operation of the autonomous vehicle, to determine the presence of any such (less important or unimportant) elements in the image.

In step 2020, a blurring module of the image blurring process applies one or more techniques to effectively blur, or reduce the resolution of, any less important or unimportant regions and/or objects in the image, thereby creating a modified image. For example, the blurring module may selectively apply a Gaussian smoothing algorithm, one or more filters, and/or one or more other mechanisms to blur the less important or unimportant regions and/or objects (and not the more important regions and/or objects) in the image. In an example embodiment, blurring may include revising a size of the area to be blurred based on at least one heat map indicating relative probabilities for whether a particular object will be present in particular locations of the combined image, as described above with respect to FIG. 15.

As may be appreciated, a blurring level, i.e., a degree to which a region and/or object is blurred, may vary for different regions and/or objects. For example, a blurring level may be dynamically adjusted based on a complexity of the region and/or object and a degree to which the region and/or object is considered to be less important (or unimportant). Moreover, the blurring level may vary based on an available bit rate, bandwidth consideration, or otherwise. For example, a tiered set of blurring levels can be applied, with different degrees of blurring corresponding to different available bit rates, bandwidths, etc. The tiers may be determined, e.g., based on historical data, human perception tests, or otherwise. For example, a first degree of blurring can apply when the bandwidth is X (e.g., 3 Megabits per second (Mbps), though X can be any suitable value) and a second, higher degree of blurring can apply when the bandwidth is a value less than X (e.g., 2 Mbps, though the value can be higher or lower than 2 Mbps). It should be appreciated that any (or no) amount of granularity may be selected for the blurring levels.

In step 2025, a blending module of the image blurring process applies one or more blending mechanisms (e.g., a gradient descent blending) to edges of any (blurred) less important or unimportant regions and/or objects in the image to create a final image. For example, the blending may mitigate blockiness and sharp edges, e.g., to ensure pixels for blurred and non-blurred portions of the image blend together.

In step 2030, an encoder module of the image blurring process encodes the final image based on the important and/or regions (and/or objects) to create an encoded image. For example, the encoder module can create one or more data segments representing the final image so that areas of the image with higher visual acuity (e.g., a non-blurred portion of the final image) are enhanced and/or better preserved as compared to other areas of the final image. For example, the encoder module can include one or more encoder processes, which the encoder module can select and/or configure, as appropriate, to enhance and/or preserve these areas of the final image. In step 2035, the encoder module transmits the encoded image (i.e., the one or more data segments representing the final image) to the remote operations system via a network.

Figure 21:
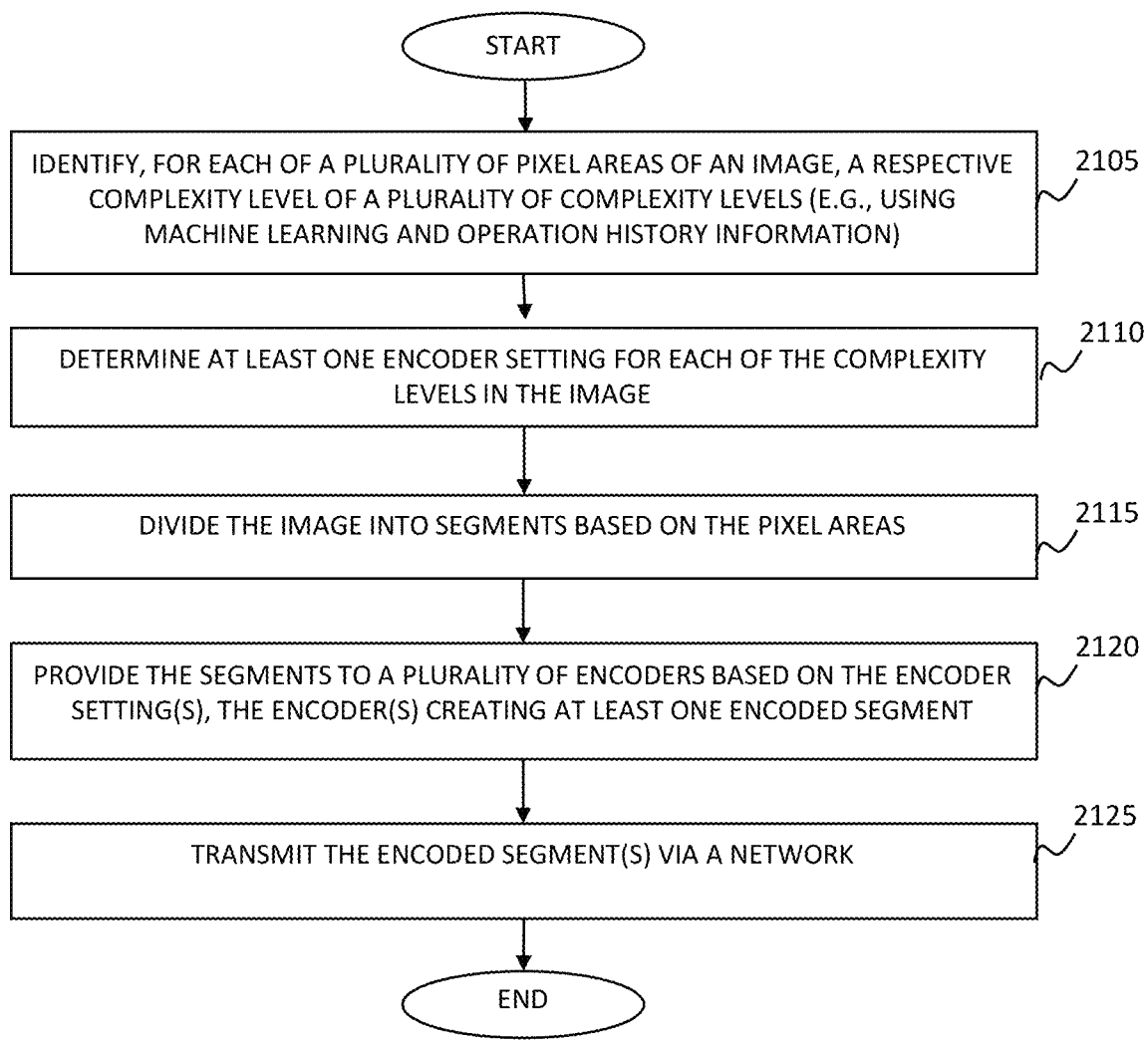
FIG. 21 is a flow chart of a method for leveled video encoding for image quality enhancement for autonomous vehicle remote operations, according to an example embodiment.

FIG. 21 is a flow chart of a method 2100 for leveled video encoding for image quality enhancement for autonomous vehicle remote operations, according to an example embodiment. In step 2105, an image leveling process of an image processing system identifies, for each of a plurality of pixel areas of an image, a respective complexity level of a plurality of complexity levels. The image processing system can include, e.g., an image processing system of the autonomous vehicle, such as the image processing system 840 described above with reference to FIG. 8. The image can include a still image and/or a video image.

Each complexity level corresponds to one or more encoding quality settings for a respective pixel area in the image. For example, complexity levels can be associated with priority levels, with higher priority pixel areas generally being associated with one or more higher quality settings than lower priority pixel areas. A level processing module of the image leveling process can include, and/or reference, one or more machine learning and/or statistical logic mechanisms to identify the complexity levels and pixel areas in the image. The machine learning and/or statistical logic mechanisms can include, for example, one or more trained computer vision models or other logic for comparing the image to known scenes for which relative priorities and/or quality settings may be associated. For example, the machine learning and/or statistical logic mechanisms can compare the image to data regarding known scenes (e.g., scenes of particular traffic patterns, pedestrian behaviors, construction zones, skylines, road surfaces, foliage, etc.), to identify respective complexities and/or priorities of pixel areas in the image.

As may be appreciated a granularity of the complexity levels may vary, e.g., based on an available bit rate, bandwidth consideration, or otherwise. For example, only one or a few complexity levels (such as a high complexity level and a low complexity level) can be used with respect to certain scenes or for certain applications, while many complexity levels can be used for certain other scenes or applications. For example, a relatively simple complexity level scheme may involve identifying a substantially central region of an image as a first pixel area with a higher priority complexity level, and a surrounding region of the image as a second pixel area with a lower priority complexity level. The pixel areas and/or complexity levels may be identified, for example, so that bit rate fluctuation can be substantially minimized and/or so that pixel areas to be encoded with relatively high quality may be substantially minimized.

In step 2110, the level processing module determines at least one encoder setting for each of the complexity levels in the image. The encoder settings may vary, e.g., based on qualities associated with which each encoder is expected to encode data and/or one or more capabilities or other configurations of each encoder. For example, a finer encoder setting may be determined for a higher priority complexity level, while a coarser encoder setting may be determined for a lower priority complexity level. In step 2115, a segment processing module divides the image into segments based on the pixel areas. Each segment may include data related to all of, or part of, a pixel area.

In step 2120, the segment processing module provides the segments to a plurality of encoders based on the encoder settings. For example, if a particular segment is associated with a high complexity level, the segment may be provided to an encoder with settings appropriate for applying relatively find encoding to the segment, while a segment associated with a lower complexity level may be provided to an encoder with a setting appropriate to increase encoding efficiency by applying a coarser encoding. In an example embodiment, multiple encoders may be configured to operate in parallel so that multiple segments can be encoded substantially simultaneously. As will be appreciated, segments may be queued for encoding.

In step 2125, the encoder modules transmit the encoded segments to a network. That is, the encoded segment are effectively sent via a network to a receiver, e.g., to a remote operations system. The encoded segments may be sent in substantially any order, which may or may not be optimized.

Figure 22:
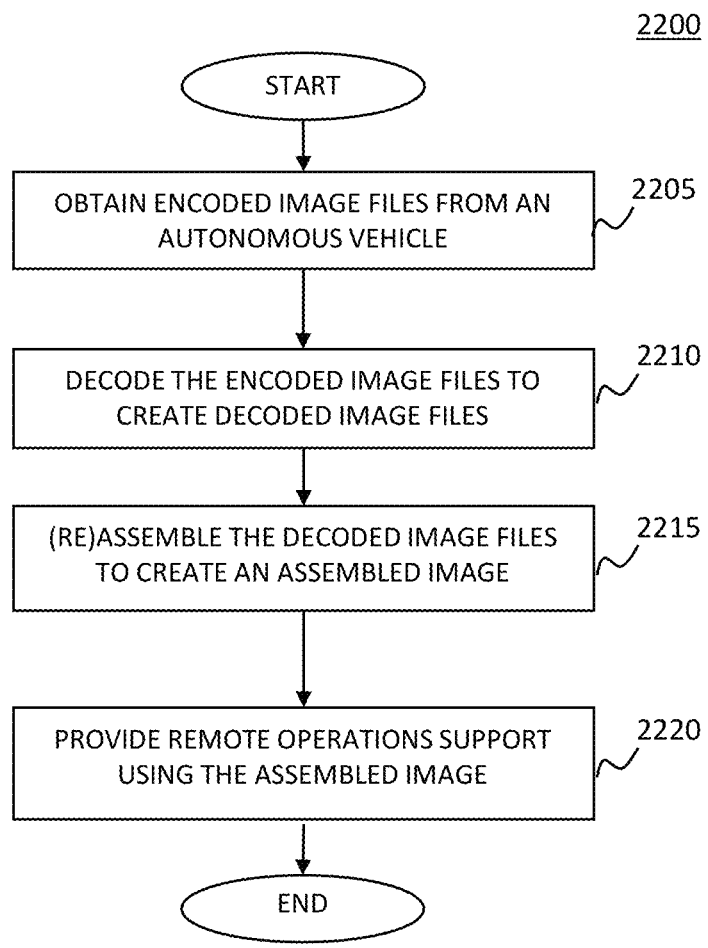
FIG. 22 is a flow chart of a method for providing remote operations support for an autonomous vehicle using an image that has been enhanced according to the techniques described herein, according to an example embodiment.

FIG. 22 is a flow chart of a method 2200 for providing remote operations support for an autonomous vehicle using an image that has been enhanced according to the techniques described herein, according to an example embodiment. In step 2205, a computing device of a remote operations system obtains encoded image files from an autonomous vehicle. The computing device can be, e.g., the computing device 1050 described above with reference to FIG. 10. For example, the encoded image files can include segments with information regarding one or more pixel areas of an image.

In step 2210, the computing device decodes the encoded image files to create decoded image files. For example, the computing device may include or access one or more decoder modules, which are configured to decode respective image files. For example, one decoder may be configured to decode image files including coarsely encoded image segments, while another decoder may be configured to decode image files including finely encoded image segments. The decoding may (but does not have to) occur substantially in parallel.

In step 2215, the computing device (re)assembles the decoded image files to create an assembled image. The assembled image can include one or more portions with a quality level based on the applicable encoding for the corresponding encoded image file. For example, one or more portions corresponding to a higher level encoding process may have a higher resolution and/or quality than one or more portions corresponding to a lower level encoding process. In an example embodiment, the computing device can cause the assembled image to be displayed on a visual interface in communication with the computing device. In step 2220, remote operations support is provided by the remote operations system, either automatically or through human operator input, using the assembled image.

As would be recognized by a person of skill in the art, the steps associated with the operational flows and methods of the present disclosure, including the operational flows and methods presented in FIGS. 10 and 18-22 may vary. Steps may be added, removed, altered, combined, and reordered without departing from the spirit or the scope of the present disclosure. Therefore, the example operational flows and methods are to be considered illustrative and not restrictive, and the examples are not to be limited to the details given herein but may be modified within the scope of the appended claims.

Figure 23:
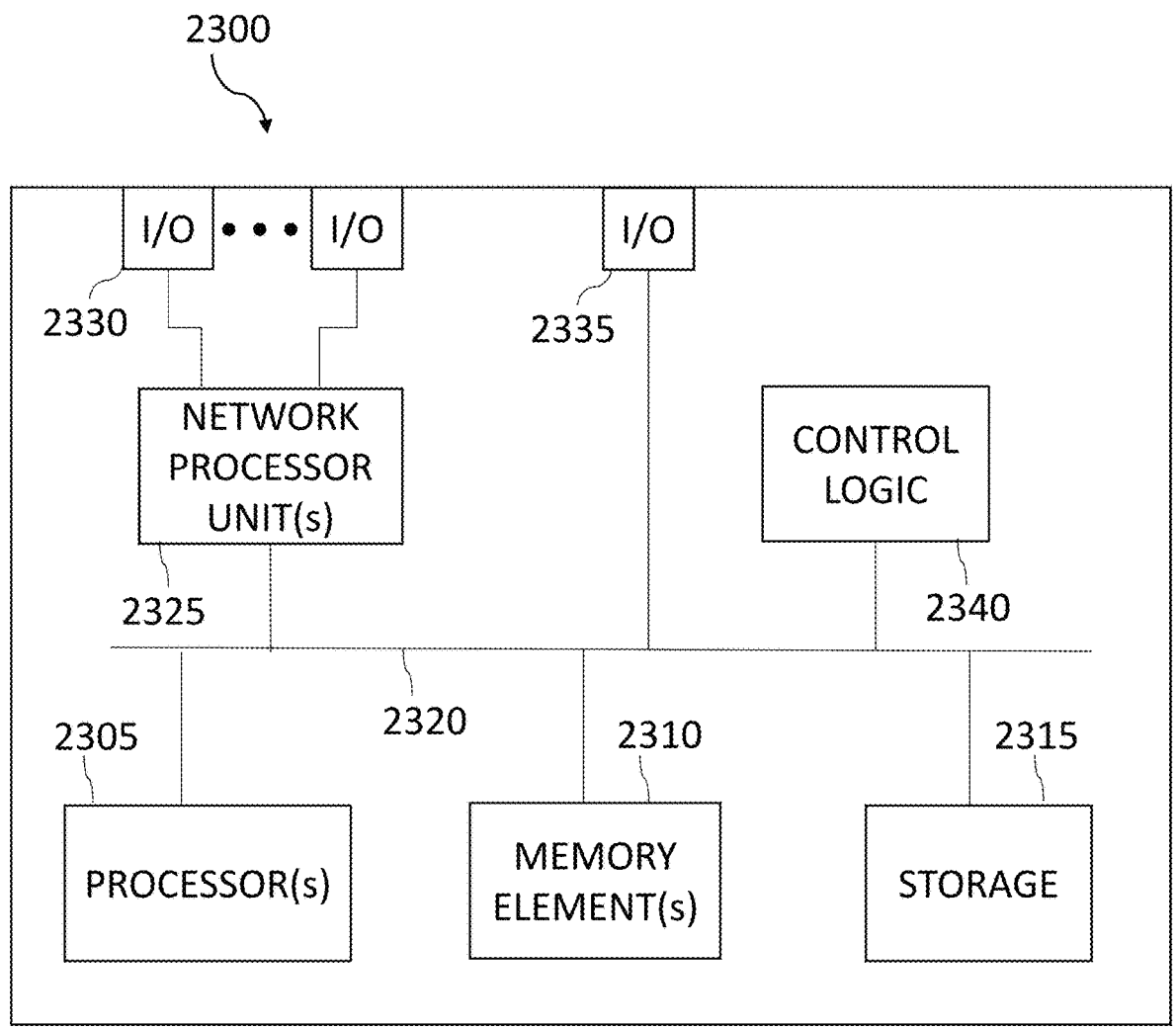
FIG. 23 is a block diagram of a computing device configured to perform functions associated with the techniques described herein, according to an example embodiment.

Referring now to FIG. 23, FIG. 23 illustrates a hardware block diagram of a computing device 2300 that may perform functions associated with operations discussed herein in connection with the techniques depicted in FIGS. 1-22. In various example embodiments, a computing device, such as computing device 2300 or any combination of computing devices 2300, may be configured as any entity/entities as discussed for the techniques depicted in connection with FIGS. 1-22, such as (but not limited to) the sensor system 820, communications system 830, image processing system 840, remote operations subsystem 930, vehicle control system 990, vehicle assistance system 995, computing device 1050, communications module 1057, or visual interface 1085, in order to perform operations of the various techniques discussed herein.

In at least one embodiment, computing device 2300 may include one or more processor(s) 2305, one or more memory element(s) 2310, storage 2315, a bus 2320, one or more network processor unit(s) 2325 interconnected with one or more network input/output (I/O) interface(s) 2330, one or more I/O interface(s) 2335, and control logic 2340. In various embodiments, instructions associated with logic for computing device 2300 can overlap in any manner and are not limited to the specific allocation of instructions and/or operations described herein.

In at least one embodiment, processor(s) 2305 is/are at least one hardware processor configured to execute various tasks, operations and/or functions for computing device 2300 as described herein according to software and/or instructions configured for computing device. Processor(s) 2305 (e.g., a hardware processor) can execute any type of instructions associated with data to achieve the operations detailed herein. In one example, processor(s) 2305 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 2310 and/or storage 2315 is/are configured to store data, information, software, and/or instructions associated with computing device 2300, and/or logic configured for memory element(s) 2310 and/or storage 2315. For example, any logic described herein (e.g., control logic 2340) can, in various embodiments, be stored for computing device 2300 using any combination of memory element(s) 2310 and/or storage 2315. Note that in some embodiments, storage 2315 can be consolidated with memory element(s) 2310 (or vice versa), or can overlap/exist in any other suitable manner.

In at least one embodiment, bus 2320 can be configured as an interface that enables one or more elements of computing device 2300 to communicate in order to exchange information and/or data. Bus 2320 can be implemented with any architecture designed for passing control, data and/or information between processors, memory elements/storage, peripheral devices, and/or any other hardware and/or software components that may be configured for computing device 2300. In at least one embodiment, bus 2320 may be implemented as a fast kernel-hosted interconnect, potentially using shared memory between processes (e.g., logic), which can enable efficient communication paths between the processes.

In various embodiments, network processor unit(s) 2325 may enable communication between computing device 2300 and other systems, entities, etc., via network I/O interface(s) 2330 to facilitate operations discussed for various embodiments described herein. In various embodiments, network processor unit(s) 2325 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 2300 and other systems, entities, etc. to facilitate operations for various embodiments described herein. In various embodiments, network I/O interface(s) 2330 can be configured as one or more Ethernet port(s), Fibre Channel ports, and/or any other I/O port(s) now known or hereafter developed. Thus, the network processor unit(s) 2325 and/or network I/O interfaces 2330 may include suitable interfaces for receiving, transmitting, and/or otherwise communicating data and/or information in a network environment.

I/O interface(s) 2335 allow for input and output of data and/or information with other entities that may be connected to computer device 2300. For example, I/O interface(s) 2335 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 2340 can include instructions that, when executed, cause processor(s) 2305 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 2340) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 2310 and/or storage 2315 can store data, software, code, instructions (e.g., processor instructions), logic, parameters, combinations thereof, and/or the like used for operations described herein. This includes memory element(s) 2310 and/or storage 2315 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include obtaining, by an image processing system of an autonomous vehicle, a plurality of images captured from at least two different cameras of the autonomous vehicle. Two or more of the plurality of images can be stitched together to create an enhanced combined image. Stitching together two or more of the plurality of images can include, e.g., replacing pixels from a first image of the plurality of images with pixels from a second image of the plurality of images. For example, obtaining the plurality of images can include obtaining the first image of the plurality of images from a first camera and obtaining the second image of the plurality of images from a second camera, the first camera having a larger field of view than that of the second camera.

A portion of the combined image can be blurred to create an enhanced combined image. For example, blurring the portion of the combined image can include identifying the portion of the combined image as less important for purposes of the remote operations support, and blurring the portion of the combined image to create the enhanced combined image. Identifying the portion of the combined image as less important for purposes of the remote operations support can include, e.g., using machine learning logic to compare at least the portion of the combined image with at least one of a known unimportant region or a known unimportant object. Blurring also may (but does not necessarily have to) include revising a size of the portion based on at least one heat map indicating relative probabilities for whether a particular object will be present in particular locations of the combined image.

A plurality of pixel areas of the enhanced combined image can be encoded using a corresponding quality setting for respective pixel areas to create a plurality of encoded image files. For example, the encoding can include: identifying, for each of the pixel areas of the enhanced combined image, a respective complexity level of a plurality of complexity levels; determining at least one quality setting for each of the complexity levels in the image; dividing the image into segments based on the pixel areas, each segment comprising at least a portion of a corresponding one of the pixel areas; and encoding the respective segments with a corresponding quality setting for each pixel area. The encoded image files can be transmitted to a remote operations system associated with the autonomous vehicle for remote operations support.

In another form, an apparatus can include: a communication interface configured to enable network communications; one or more memories configured to store data; and one or more processors coupled to the communication interface and one or more memories and configured to perform operations on behalf of an autonomous vehicle, the operations including: obtaining a plurality of images captured from at least two different cameras of the autonomous vehicle; stitching together the plurality of images to create a combined image; blurring a portion of the combined image to create an enhanced combined image; encoding a plurality of pixel areas of the enhanced combined image using a corresponding quality setting for respective pixel areas to create a plurality of encoded image files; and transmitting the encoded image files to a remote operations system associated with the autonomous vehicle for remote operations support.

In another form, one or more non-transitory computer readable storage media can include instructions that, when executed by at least one processor, are operable to: obtain a plurality of images captured from at least two different cameras of an autonomous vehicle; stitch together the plurality of images to create a combined image; blur a portion of the combined image to create an enhanced combined image; encode a plurality of pixel areas of the enhanced combined image using a corresponding quality setting for respective pixel areas to create a plurality of encoded image files; and transmit the encoded image files to a remote operations system associated with the autonomous vehicle for remote operations support.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    obtaining, by an image processing system of an autonomous vehicle, a plurality of images captured from at least two different cameras of the autonomous vehicle;
    stitching together two or more of the plurality of images to create a combined image;
    identifying a portion of the combined image as less important for purposes of remote operations support using machine learning logic to compare at least the portion of the combined image with at least one of a known unimportant region or a known unimportant object;
    blurring the portion of the combined image to create an enhanced combined image;
    determining at least one quality setting for each complexity level of a plurality of complexity levels identified for each pixel area of a plurality of pixel areas of the enhanced combined image;
    encoding the pixel areas using a corresponding quality setting for respective pixel areas to create a plurality of encoded image files; and
    transmitting the encoded image files to a remote operations system associated with the autonomous vehicle for the remote operations support.

2. The computer-implemented method of claim 1, wherein stitching together the two or more of the plurality of images comprises replacing pixels from a first image of the plurality of images with pixels from a second image of the plurality of images.

3. The computer-implemented method of claim 2, wherein obtaining the plurality of images comprises obtaining the first image of the plurality of images from a first camera and obtaining the second image of the plurality of images from a second camera, the first camera having a larger field of view than that of the second camera.

4. The computer-implemented method of claim 1, wherein blurring further comprises revising a size of the portion based on at least one heat map indicating relative probabilities for whether a particular object will be present in particular locations of the combined image.

5. The computer-implemented method of claim 1, wherein encoding the plurality of pixel areas comprises:
    identifying, for each of the pixel areas of the enhanced combined image, a respective complexity level of the plurality of complexity levels.

6. The computer-implemented method of claim 5, wherein encoding the plurality of pixel areas comprises:
    dividing the enhanced combined image into segments based on the pixel areas, each segment comprising at least a portion of a corresponding one of the pixel areas.

7. The computer-implemented method of claim 6, wherein encoding the plurality of pixel areas comprises:
    encoding the respective segments with a corresponding quality setting for each pixel area.

8. An apparatus comprising:
    a communication interface configured to enable network communications;
    one or more memories configured to store data; and
    one or more processors coupled to the communication interface and the one or more memories and configured to perform operations on behalf of an autonomous vehicle, the operations including:
        obtaining a plurality of images captured from at least two different cameras of the autonomous vehicle;
        stitching together two or more of the plurality of images to create a combined image;
        identifying a portion of the combined image as less important for purposes of remote operations support using machine learning logic to compare at least the portion of the combined image with at least one of a known unimportant region or a known unimportant object;
        blurring the portion of the combined image to create an enhanced combined image;
        determining at least one quality setting for each complexity level of a plurality of complexity levels identified for each pixel area of a plurality of pixel areas of the enhanced combined image;
        encoding the pixel areas using a corresponding quality setting for respective pixel areas to create a plurality of encoded image files; and
        transmitting the encoded image files to a remote operations system associated with the autonomous vehicle for the remote operations support.

9. The apparatus of claim 8, wherein the one or more processors are further configured to stitch together the two or more of the plurality of images by replacing pixels from a first image of the plurality of images with pixels from a second image of the plurality of images.

10. The apparatus of claim 9, wherein the one or more processors are further configured to, obtain the plurality of images by obtaining the first image of the plurality of images from a first camera and obtaining the second image of the plurality of images from a second camera, the first camera having a larger field of view than the second camera.

11. The apparatus of claim 8, wherein the one or more processors are further configured to revise a size of the portion based on at least one heat map indicating relative probabilities for whether a particular object will be present in particular locations of the combined image.

12. The apparatus of claim 8, wherein the one or more processors are further configured to encode the plurality of pixel areas by:
    identifying, for each of the pixel areas of the enhanced combined image, a respective complexity level of the plurality of complexity levels.

13. The apparatus of claim 12, wherein the one or more processors are further configured to encode the plurality of pixel areas by:
    dividing the enhanced combined image into segments based on the pixel areas, each segment comprising at least a portion of a corresponding one of the pixel areas.

14. The apparatus of claim 13, wherein the one or more processors are further configured to encode the plurality of pixel areas by:
    encoding the respective segments with a corresponding quality setting for each pixel area.

15. One or more non-transitory computer readable storage media comprising instructions that, when executed by at least one processor, are operable to:

obtain a plurality of images captured from at least two different cameras of an autonomous vehicle;
stitch together two or more of the plurality of images to create a combined image;
identify a portion of the combined image as less important for purposes of remote operations support using machine learning logic to compare at least the portion of the combined image with at least one of a known unimportant region or a known unimportant object;
blur the portion of the combined image to create an enhanced combined image;
determine at least one quality setting for each complexity level of a plurality of complexity levels identified for each pixel area of a plurality of pixel areas of the enhanced combined image;
encode the pixel areas using a corresponding quality setting for respective pixel areas to create a plurality of encoded image files; and
transmit the encoded image files to a remote operations system associated with the autonomous vehicle for the remote operations support.

16. The one or more non-transitory computer readable storage media of claim 15, wherein the instructions, when executed by the at least one processor, are further operable to stitch together the two or more of the plurality of images by replacing pixels from a first image of the plurality of images with pixels from a second image of the plurality of images.

17. The one or more non-transitory computer readable storage media of claim 16, wherein the instructions, when executed by the at least one processor, are further operable to obtain the plurality of images by obtaining the first image of the plurality of images from a first camera and obtaining the second image of the plurality of images from a second camera, the first camera having a larger field of view than the second camera.

18. The one or more non-transitory computer readable storage media of claim 15, wherein the instructions, when executed by the at least one processor, are further operable to revise a size of the portion based on at least one heat map indicating relative probabilities for whether a particular object will be present in particular locations of the combined image.

19. The one or more non-transitory computer readable storage media of claim 15, wherein the instructions, when executed by the at least one processor, are further operable to encode the plurality of pixel areas by:
identifying, for each of the pixel areas of the enhanced combined image, the respective complexity level of the plurality of complexity levels.

20. The one or more non-transitory computer readable storage media of claim 19, wherein the instructions, when executed by the at least one processor, are further operable to encode the plurality of pixel areas by:
dividing the enhanced combined image into segments based on the pixel areas, each segment comprising at least a portion of a corresponding one of the pixel areas.

21. The one or more non-transitory computer readable storage media of claim 20, wherein the instructions, when executed by the at least one processor, are further operable to encode the plurality of pixel areas by:
encoding the respective segments with a corresponding quality setting for each pixel area.

* * * * *